(12) United States Patent
Tustin et al.

(10) Patent No.: US 9,268,049 B2
(45) Date of Patent: Feb. 23, 2016

(54) SEISMIC ACQUISITION USING SOLID STREAMERS

(71) Applicant: WESTERNGECO L.L.C., Houston, TX (US)

(72) Inventors: Gary John Tustin, Sawston (GB); Steven Antony Gahlings, Great Cambourne (GB); Robert Hughes Jones, Fen Drayton (GB)

(73) Assignee: WesternGeco L.L.C., Houston, TX (US)

( * ) Notice: Subject to any disclaimer, the term of this patent is extended or adjusted under 35 U.S.C. 154(b) by 469 days.

(21) Appl. No.: 13/714,731

(22) Filed: Dec. 14, 2012

(65) Prior Publication Data

US 2013/0100767 A1    Apr. 25, 2013

Related U.S. Application Data

(63) Continuation-in-part of application No. 13/519,838, filed as application No. PCT/IB2010/003352 on Dec. 24, 2010, now abandoned.

(60) Provisional application No. 61/291,420, filed on Dec. 31, 2009.

(51) Int. Cl.
*G01V 1/38* (2006.01)
*G01V 1/20* (2006.01)
(Continued)

(52) U.S. Cl.
CPC ............. *G01V 1/186* (2013.01); *G01V 1/201* (2013.01); *G01V 1/38* (2013.01); *G01V 1/3808* (2013.01);
(Continued)

(58) Field of Classification Search
CPC ..... G01V 1/38; G01V 1/201; G01V 2001/205; G01V 2001/207
USPC ..................................... 367/20, 154
See application file for complete search history.

(56) References Cited

U.S. PATENT DOCUMENTS 4,798,853 A * 1/1989 Handlin, Jr. .................. 523/173
4,992,991 A   2/1991 Young et al.
(Continued)

FOREIGN PATENT DOCUMENTS

GB    2149916    6/1985
GB    2439816    1/2008
(Continued)

OTHER PUBLICATIONS

Combee et al., "Over/under acquisition and data processing: the next quantum leap in seismic technology?" First Break, Jun. 2006, vol. 24: pp. 81-95.
(Continued)

*Primary Examiner* — Ian J Lobo
(74) *Attorney, Agent, or Firm* — Steven A. Gahlings

(57) ABSTRACT

An embodiment of the disclosed invention includes a method for attenuating noise during acquisition of marine seismic date. The method includes placing a seismic streamer in a body of water. The seismic streamer includes a streamer body having a length and a channel, a seismic sensor disposed within the channel, and a gel disposed within the channel. The gel has a complex viscosity of at least 50 Pascals and includes a concentration of a polymer between the range of about 5% and about 25% by weight. The method also includes placing a source in the body of water. The seismic streamer and the source are towed through the body of water and the source is fired while being towed through the body of water. Data is collected from the seismic streamer as it is towed through the body of water.

25 Claims, 18 Drawing Sheets

(51) Int. Cl.
*G01V 1/18* (2006.01)
*G01V 1/36* (2006.01)
*G01V 13/00* (2006.01)

(52) U.S. Cl.
CPC . *G01V 1/36* (2013.01); *G01V 13/00* (2013.01); *G01V 2001/205* (2013.01); *G01V 2001/207* (2013.01)

(56) References Cited

U.S. PATENT DOCUMENTS

| | | | |
|---|---|---|---|
| 6,477,111 B1 * | 11/2002 | Lunde et al. | 367/20 |
| 6,493,636 B1 | 12/2002 | DeKok | |
| 7,203,130 B1 | 4/2007 | Welker | |
| 7,239,577 B2 | 7/2007 | Tenghamn et al. | |
| 7,377,224 B2 | 5/2008 | Ryan et al. | |
| 2002/0136513 A1 * | 9/2002 | Consonni et al. | 385/113 |
| 2006/0023568 A1 | 2/2006 | Fernihough et al. | |
| 2006/0117874 A1 | 6/2006 | Goujon et al. | |
| 2006/0250890 A1 | 11/2006 | van den Berg et al. | |
| 2007/0064528 A1 * | 3/2007 | Metzbower et al. | 367/20 |
| 2007/0297286 A1 * | 12/2007 | Stenzel et al. | 367/20 |
| 2008/0008034 A1 * | 1/2008 | Tenghamn et al. | 367/20 |
| 2008/0008047 A1 * | 1/2008 | Lunde et al. | 367/154 |
| 2008/0285381 A1 | 11/2008 | Moldoveanu et al. | |
| 2010/0020644 A1 * | 1/2010 | Vignaux | 367/154 |
| 2010/0039889 A1 * | 2/2010 | Teigen et al. | 367/20 |
| 2010/0039890 A1 * | 2/2010 | Tustin et al. | 367/20 |
| 2011/0044128 A1 * | 2/2011 | Storteig et al. | 367/20 |
| 2011/0103180 A1 * | 5/2011 | Borgen | 367/20 |
| 2012/0176859 A1 * | 7/2012 | Pabon et al. | 367/20 |
| 2012/0230150 A1 | 9/2012 | Sudow et al. | |
| 2013/0100767 A1 * | 4/2013 | Tustin et al. | 367/24 |

FOREIGN PATENT DOCUMENTS

| | | | | |
|---|---|---|---|---|
| GB | 2446259 A | * | 8/2008 | G01V 1/20 |
| WO | 2008102134 A2 | | 8/2008 | |
| WO | 2011080571 A9 | | 10/2011 | |

OTHER PUBLICATIONS

Reddy et al., "Use of combined shear and pressure acoustic waves to study interfacial and bulk viscoelastic effects in aqueous polymeric gels and the influence of electrode potentials," Faraday Discussions, 1997, vol. 107: pp. 177-196.

International Search Report of PCT Application No. PCT/IB2010/003352 dated Aug. 1, 2011: pp. 1-9.

* cited by examiner

SEISMIC ACQUISITION USING SOLID STREAMERS

CROSS-REFERENCE TO RELATED APPLICATIONS

This application is a continuation-in-part of U.S. patent application Ser. No. 13/519,838 filed Jun. 28, 2012 which is a National Stage Application of PCT Application No. PCT/IB2010/003352 filed Dec. 24, 2010 and claims priority to U.S. Provisional Patent Application Ser. No. 61/291,420 filed Dec. 31, 2009. All three of these applications are incorporated herein by reference in their entireties.

BACKGROUND

This disclosure generally relates to acquiring marine seismic data, and more specifically but not by way of limitation to acquiring marine seismic data using solid streamers.

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (e.g., hydrophones), others to particle motion (e.g., geophones), and industrial/seismic surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

Streamers are long cables that house various sensor networks and other devices useful in the acquisition of seismic data. Streamers may be manufactured as liquid-filled streamers or solid streamers. Prior art solid streamer cables are often constructed with a central core with transmission and power bundles that are continuous through the streamer section (a segmented portion of a streamer cable). The transmission and power bundles are typically connected to electronics modules between the streamer sections through end connectors. Also within a streamer section, there is a need to connect distributed sensors and (if present) sensor electronics by wires to transmit power and data to the electronics modules.

BRIEF SUMMARY

Some embodiments of the disclosed invention include a method for manufacturing a seismic streamer for acquiring marine seismic data. Such seismic streamers may have improved noise attenuating properties. The method may include providing a streamer body. The streamer body may have a streamer body length, one or more channels and a solid streamer core disposed within the one or more channels of the streamer body. The method may also include inserting a seismic sensor within a first channel of the streamer body and inserting a liquid gel within at least a portion of the first channel. The liquid gel may include a concentration of a thermo-reversible polymer between the range of about 5% and about 25% by weight and may have a complex viscosity between the range of about 50 Pa and about 1500 Pa. The method may further include cooling the liquid gel so that the liquid gel at least partially solidifies.

In some embodiments, the complex viscosity of the liquid gel may be between about 100 Pa and about 1000 Pa. In some embodiment, the concentration of the thermo-reversible polymer may be between about 10% and about 20% by weight, and more commonly about 15%. Where concentration is a measure of the amount of the thermo-reversible polymer contained in the gel, where the gel is in general a mixture of the thermo-reversible polymer and a medium in which the thermo-reversible polymer is dissolved or the like. The thermo-reversible polymer may be a block copolymer. The seismic streamer may attenuate noise in the range of 0 to 10 Hz and also in the range of 20 to 50 Hz. In another embodiment, the seismic streamer may attenuate noise in the range of 30 to 40 Hz. In some embodiments, the method may additionally include inserting a sensor within the portion of the first channel. The sensor may be configured to measure the viscosity of the gel.

Other embodiments of the disclosed invention include a method for attenuating noise during acquisition of marine seismic data. The method may include placing a first seismic streamer in a body of water where the first seismic streamer includes: a streamer body having a length and a channel, a seismic sensor disposed within the channel of the streamer body, and a gel disposed within at least a portion of the channel. The gel may include a concentration of a polymer between the range of about 5% and about 25% by weight and may have a complex viscosity of at least 50 Pa. The method may also include placing a source in the body of water and towing the first seismic streamer and the source through the body of water. The source may be fired while the source is being towed through the body of water and data may be collected from the first seismic streamer as it is towed through the body of water.

The first seismic streamer may attenuate a noise signal between the range of 0 to 10 Hz and also between the range of 20 to 50 Hz. In some embodiments, the first seismic streamer attenuates a noise signal between 30 and 40 Hz. The first seismic streamer and the source may be towed in a curved pattern, such as in a coil shooting process, or towed in a non-curved pattern. In embodiments where the first seismic streamer and source are towed in a curved pattern, data may be collected at a higher frequency (e.g., within the 20-50 Hz range) such that the effects of the noise attenuation are more prominent or noticeable.

In some embodiments, the first streamer includes a first plurality of streamers and the method additionally includes: placing a second seismic streamer in the body of water and collecting data from the second seismic streamer as it is towed through the body of water. The second seismic streamer may also include a gel disposed within a portion of a channel of the second seismic streamer. The gel may have a complex viscosity of at least 50 Pa, which may be different than the complex viscosity of the first seismic streamer so that the second streamer attenuates a noise signal in manner different than the first seismic streamer.

In some embodiments, the first streamer is towed at a first temporal location and/or depth and the second streamer is towed at a second temporal location and/or depth that is different than the first temporal location. In some embodiments, the effect of the gel on the collected data may be processed for properties of the gel under an applied shear force. In some embodiments, the method may additionally include filtering a noise signal by determining a period when a noise signal will arrive at a hydrophone and not collecting data during at least a portion of the determined period. To avoid collecting data during the determined portion, the hydrophone may be directed (e.g., via instructions executable by a processor) to not provide data signals during the determined period or a portion thereof. In some embodiments, the method may additionally include selecting a stiffness of the streamer skin based on the gel used so as to further attenuate noise. Selecting a stiffness of the streamer skin may include selecting stiffer or thicker skins that function with the gel to attenuate noise signals.

Other embodiments of the disclosed invention include a seismic streamer. The seismic streamer includes a streamer body having a streamer body length and a channel. The streamer also includes a seismic sensor disposed within the channel of the streamer body and a gel disposed within at least a portion of the channel. The gel includes a concentration of a polymer between the range of about 5% and about 25% by weight or any of the other ranges described herein. The gel also has a complex viscosity of at least 50 Pa, and more commonly between about 50 Pa-1500 Pa, 100 Pa-1000 Pa, and the like.

In some embodiments, the gel transforms into a solid form when in contact with water. In some embodiments, the polymer comprises a thermo-reversible polymer. In some embodiments, a stiffness of the streamer skin is selected based on the gel disposed within the at least a portion of the channel. The streamer skin and gel may function to attenuate a noise signal and thereby improve a signal-to-noise ratio.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides some embodiment(s) of the invention, and is not intended to limit the scope, applicability or configuration of the invention or inventions. Various changes may be made in the function and arrangement of elements without departing from the scope of the invention as set forth herein. Some embodiments may be practiced without all the specific details. For example, circuits may be shown in block diagrams in order not to obscure the embodiments in unnecessary detail. In other instances, well-known circuits, processes, algorithms, structures and techniques may be shown without unnecessary detail in order to avoid obscuring the embodiments.

Some embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure and may start or end at any step or block. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded or transmitted via any suitable means including memory sharing, message passing, token passing, network transmission, etc.

Figure 1:
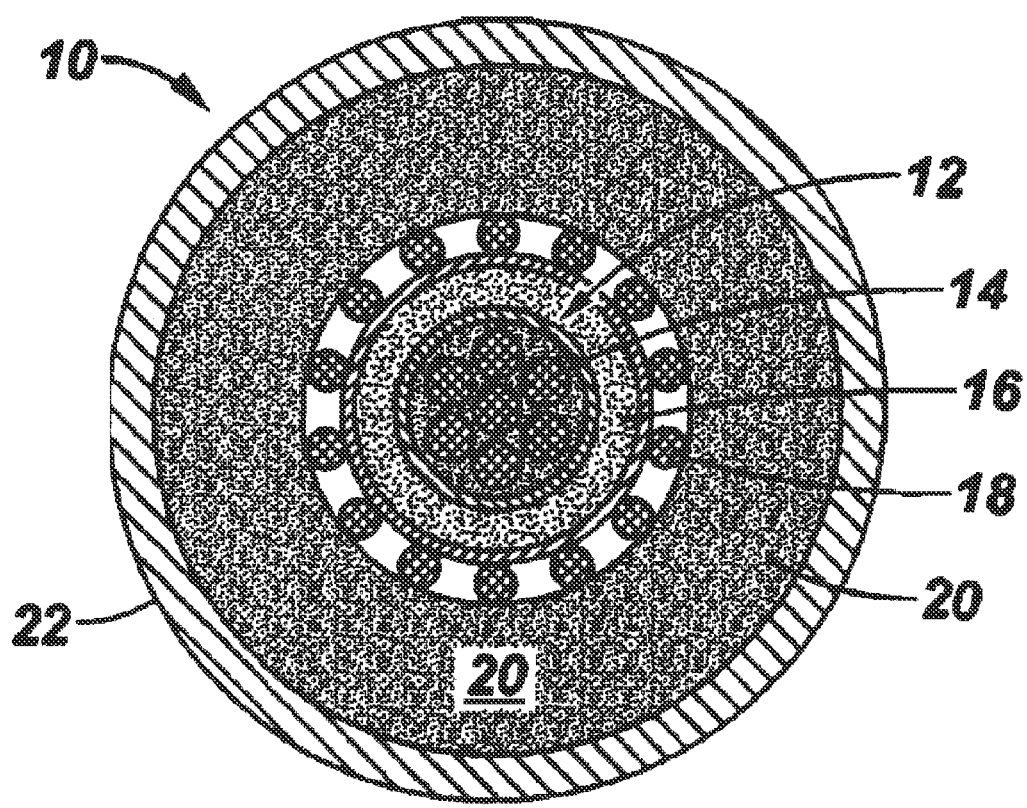
FIG. 1 is a cross-sectional view of a solid streamer cable.

FIG. 1 is a cross section of a solid streamer cable 10 includes a central core 12 having transmission bundle 14 surrounded by a strength member 16. Central core 12 is typically pre-fabricated before adding sensors and/or sensor electronics. Local wiring 18, which is used to connect the sensor and sensor electronics, is also disposed in streamer cable 10 inside of a polymer body 20 and a skin 22. The typical way to dispose wiring 18 within streamer cable 10 is to twist the wiring onto the central core 12 with a certain lay-length (or pitch) to allow for tensile cycling and bending of streamer cable 10 without generating high stresses in the wires. Wiring layers in prior art solid cables are often premade with the central core 12.

Figure 2:
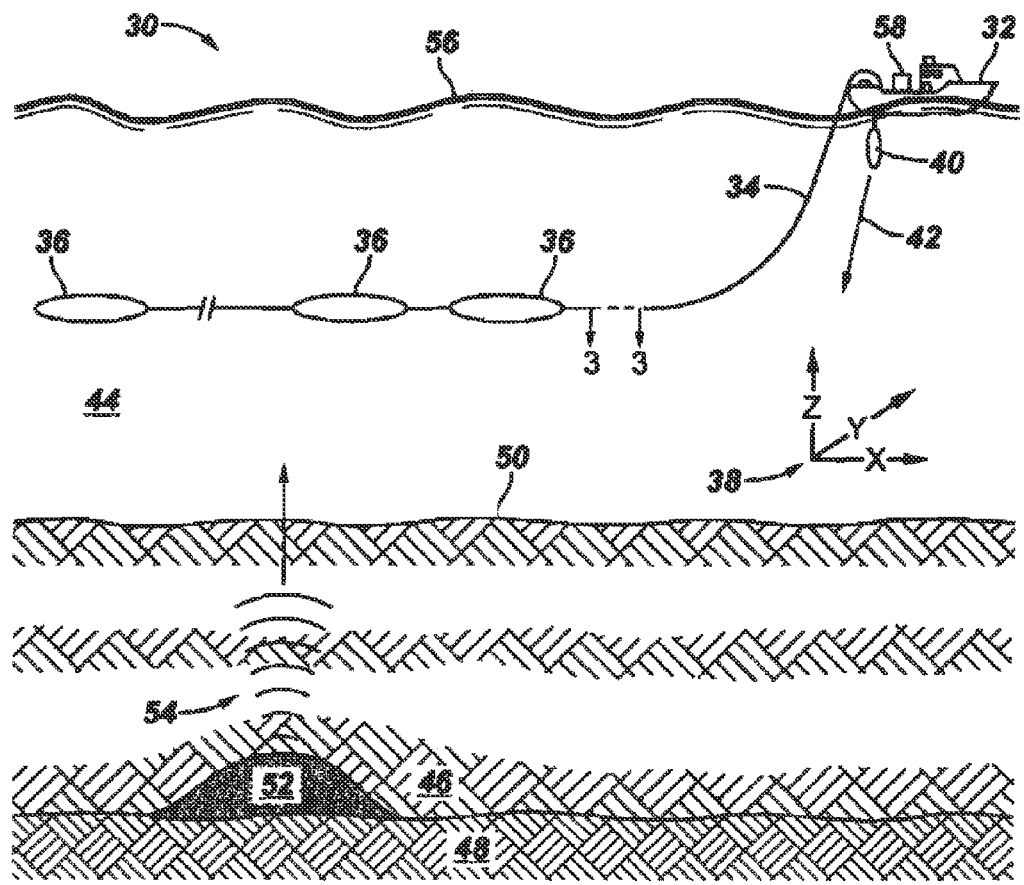
FIG. 2 is a diagram of a marine seismic data acquisition system according to some embodiments of the invention.

FIG. 2 depicts a marine seismic data acquisition system 30 in accordance with some embodiments of the disclosure. In system 30, a survey vessel 32 tows one or more seismic streamer(s) 34 (e.g., streamer 10 depicted in FIG. 1) behind vessel 20. Seismic streamer(s) 34 may be several thousand meters long and may contain various support cables, as well as wiring and/or circuitry that may be used to support communication along the streamer(s) 34. In general, each streamer 30 can include a primary cable into which is mounted seismic sensors 36 that record seismic signals. An example of sensors 36 is illustrated schematically in FIG. 2, and that in practice, the sensors 36 are disposed within the streamer cable 34.

In accordance with embodiments of the disclosure, seismic sensors 36 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components) of a particle velocity and one or more components of a particle acceleration.

Depending on the particular embodiment of the disclosure, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. The multi-component seismic sensor may be implemented as a single device or may be implemented as a plurality of devices, depending on the particular embodiment of the disclosure. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system can include seismic source 40 that may be formed from one or more seismic source elements, such as air guns, for example, which are connected to survey vessel 32. Alternatively, in other embodiments of the disclosure, seismic source 40 may operate independently of survey vessel 32, in that seismic source 40 may be coupled to other vessels or buoys, as just a few examples.

As seismic streamer(s) 34 are towed behind survey vessel 32, acoustic signals 42, often referred to as "shots", are produced by seismic source 40 and are directed down through a water column 44 into strata 46 and 48 beneath water bottom surface 50. The acoustic signals 42 are reflected from the various subterranean geological formations, such as formation 52.

The incident acoustic signals 42 that are provided by seismic source 40 produce corresponding reflected acoustic signals, or pressure waves 54, which are sensed by seismic sensors 36. The pressure waves that are received and sensed by seismic sensors 36 include "up going" pressure waves that propagate to seismic sensors 36 without reflection, as well as "down going" pressure waves that are produced by reflections of pressure waves 54 from air-water boundary 56.

Seismic sensors 36 generate signals (digital signals, for example), called "traces," that indicate the acquired measurements of the pressure wavefield and particle motion (if the sensors are particle motion sensors). The traces can be recorded and may be at least partially processed by signal processing unit 58 that is deployed on survey vessel 32, in accordance with some embodiments of the disclosure. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as geological formation 52. Subsequent analysis of the representation may reveal probable locations of hydrocarbon deposits in subterranean geological formations. Depending on the particular embodiment of the disclosure, portions of the analysis of the representation may be performed on the seismic survey vessel 32, such as by the signal processing unit 58.

Figure 3:
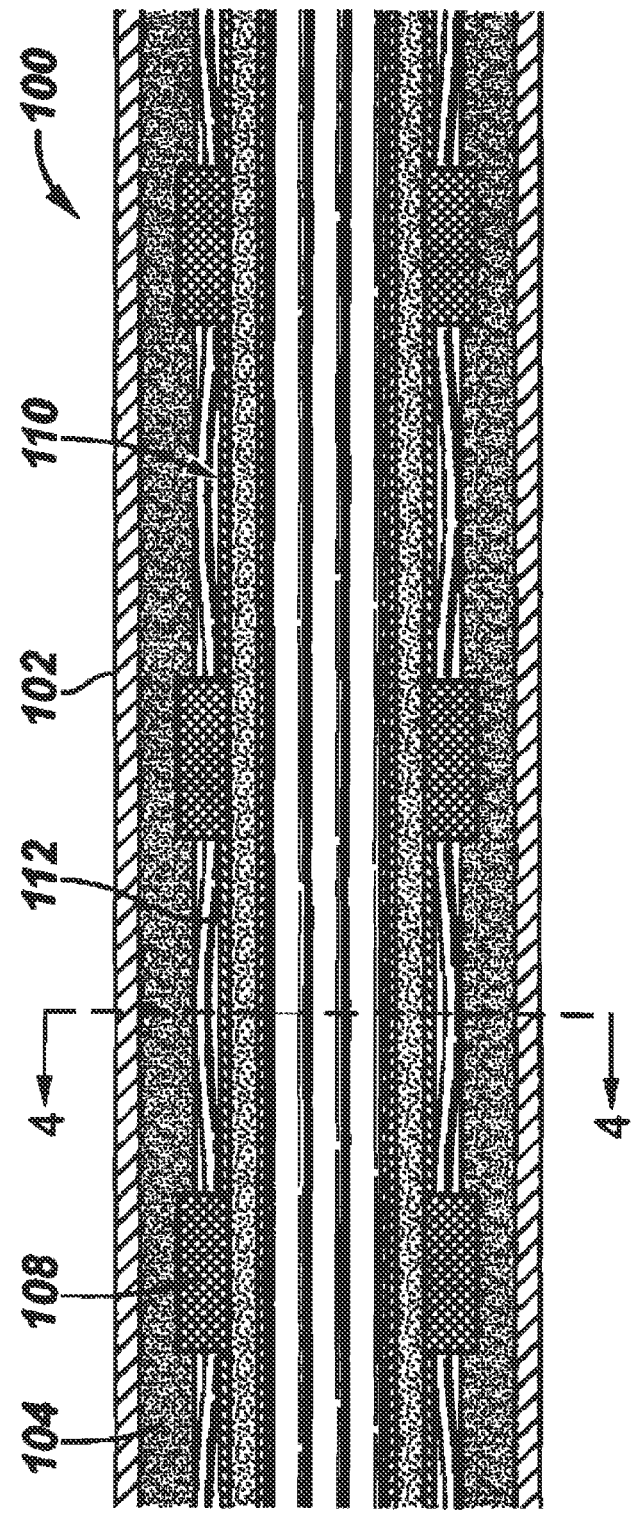
FIG. 3 is a cut-away view of a streamer cable according to one embodiment of the invention.

Referring to FIG. 3, solid streamer cable 100 according to one embodiment of the present disclosure can include a skin 102 that encloses a polymer body 104 and one or more seismic devices 108 for use in seismic data acquisition. The seismic devices 108 may include seismic sensors (e.g., a geophone, a hydrophone and/or an accelerometer) and/or sensor electronics that generally manipulate data acquired by the seismic sensors, such as an analog to digital converter that digitizes the analog data acquired by the sensors. In practice, the seismic devices 108 may be disposed within a housing (not shown). A core 110 is also disposed within the streamer cable 100 and may comprise a strength member (not shown) and often also a transmission bundle (not shown). In some embodiments, the core 110 is substantially solid. A channel 112 is formed in a polymer body 104 in an area generally adjacent to the core 110. In some embodiments, the channel 112 can be formed in the polymer body 104 away from the core 110.

Figure 4:
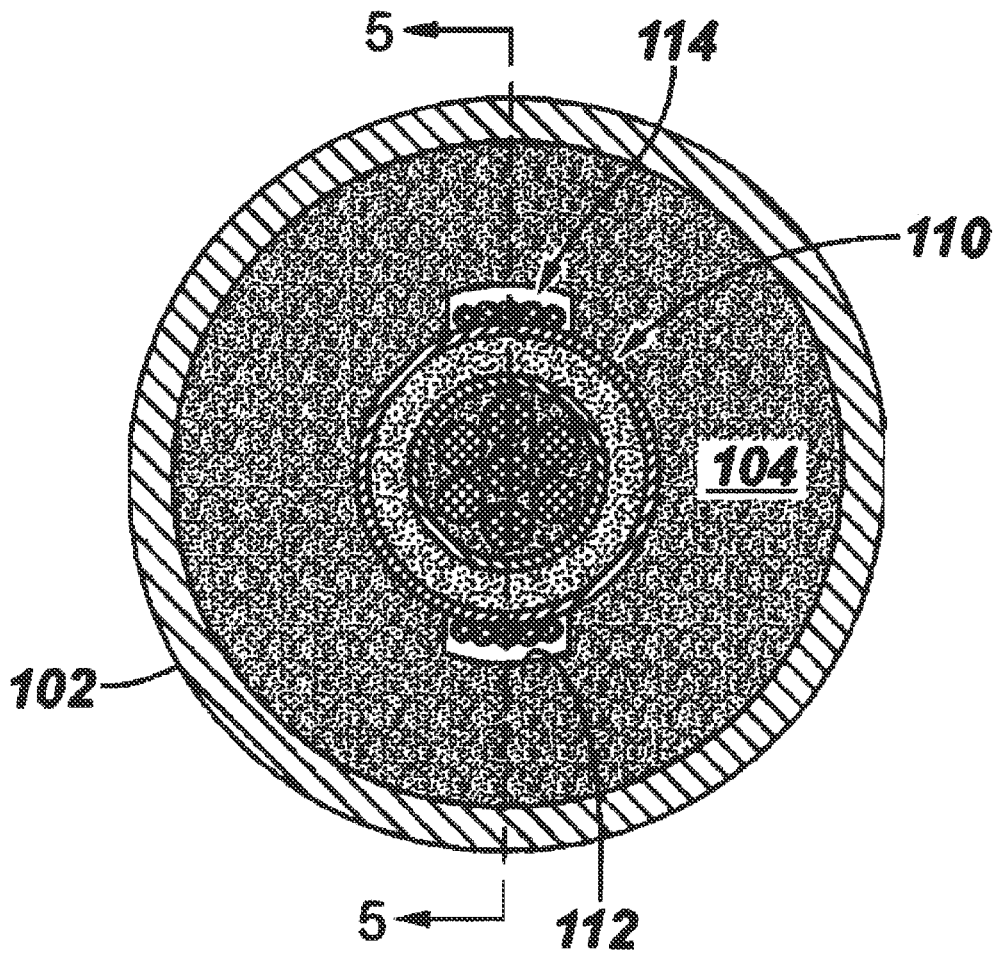
FIG. 4 is a cross-sectional view of the streamer cable taken along the line 4-4 in FIG. 3.

Referring to FIG. 4, the channel 112 provides a pathway for a wire bundle 114 to connect the various seismic devices 108 disposed within the streamer cable 100. In this embodiment, the wire bundle 114 extends through the channel 112 inline with the central core, thus providing easy access to the wire bundle for technicians to connect and/or disconnect the wires to the associated seismic devices 108.

Figure 5:
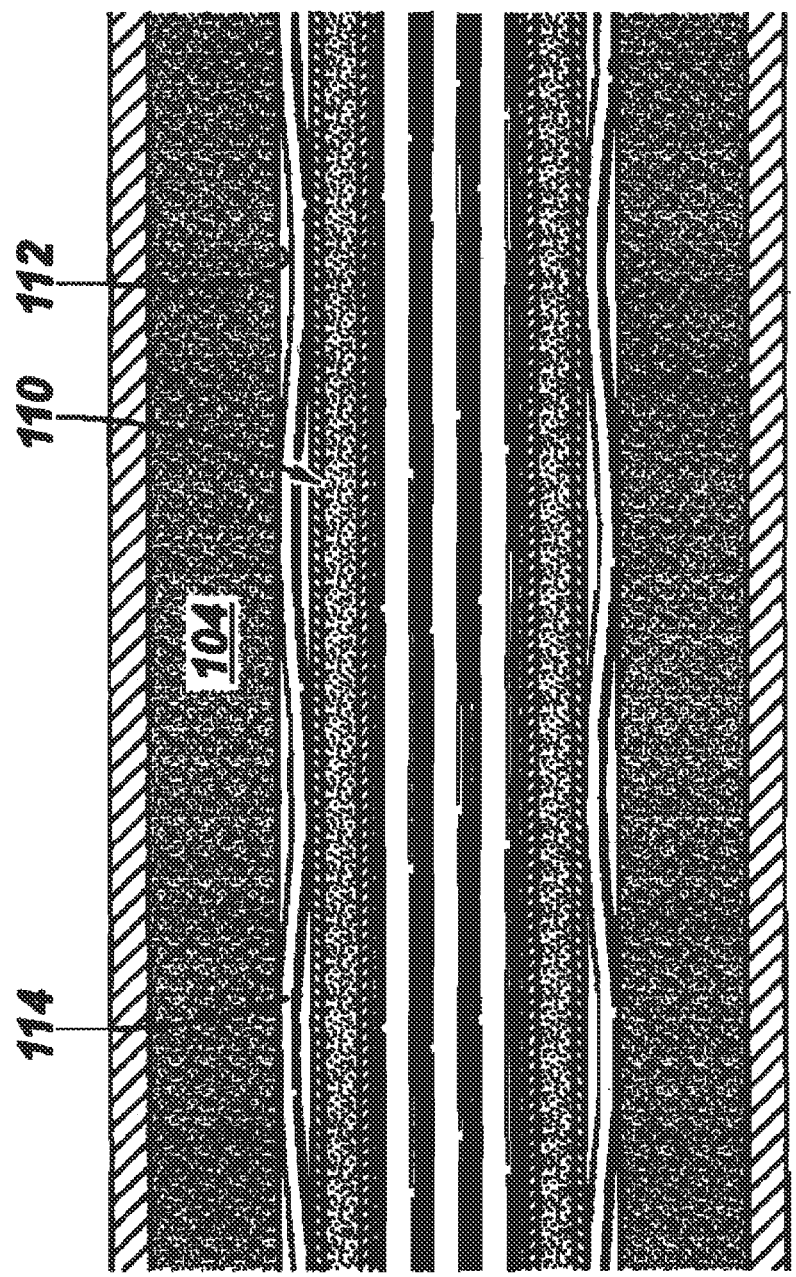
FIG. 5 is a cross-sectional view of the streamer cable taken along the line 5-5 in FIG. 4.

Referring to FIG. 5, wires 114 can be formed such that they can have slack when extending through the streamer cable 100. Slack may be imparted to the wires 114 by ensuring that the wires 114 are longer when straight than the streamer cable 100. The additional length of the wires 114 relative to the streamer cable 100 may be referred to as "over-length." To accommodate the over-length, the wires 114 may be formed to have a corrugated or S-shape when extending through the cable. In corrugated embodiments, the wires 114 may be run through teethed wheels or pre-formed plates to thus impart corrugation to the wires 114 prior to insertion within the streamer cable 100. By having slack, the wires 114 can withstand the various compressional or tensional loads experienced by the streamer cable 100 during deployment and operation.

Figure 6:
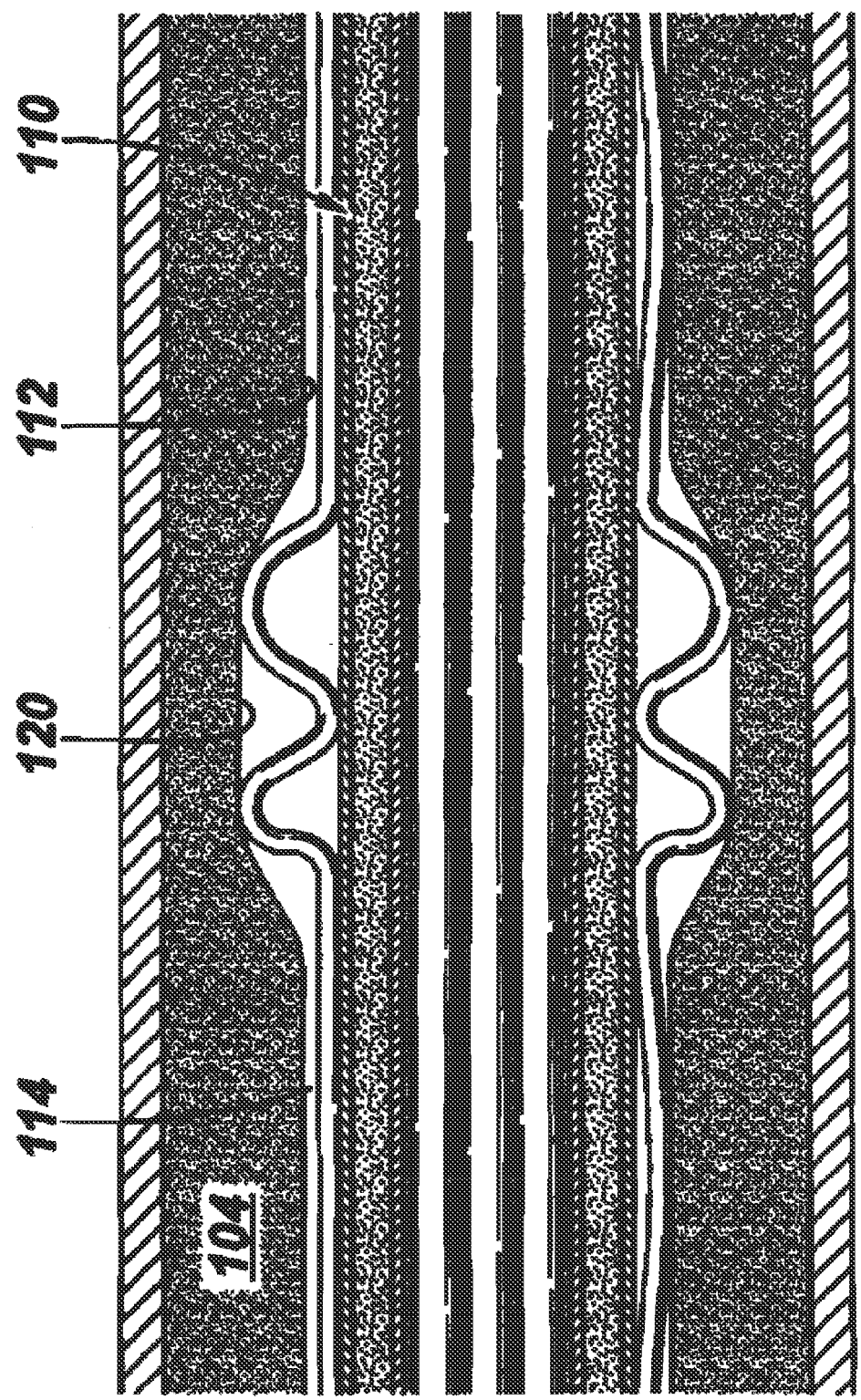
FIG. 6 is a modification of FIG. 5 to illustrate another embodiment of the invention.

Additional process can be used to impart slack to the wires 114. For example, with reference to FIG. 6, slack may be imparted to the wires 114 only at certain points along the channel 112. To accommodate such slack, enlarged cavities, such as cavity 120, may be defined in the polymer body 104 along certain portions of the channel 112. Accordingly, in this embodiment, the wires 114 can be substantially taut along some segments of the channel 112 yet incorporate slack at enlarged cavities, such as the cavity 120.

By imparting slack to the wires 114, elongation or bending of the streamer cable will only impose a portion of the tensional forces experienced by the streamer cable 100 onto the wires compared to the greater amount of tensional forces that would be experienced by taut wires. In practice, streamer cables are typically rolled on a spool and placed on a vessel for deployment at sea. Rolling a streamer cable on a spool can introduce undesirable bending strains, particularly with respect to solid streamer cables.

Figure 7:
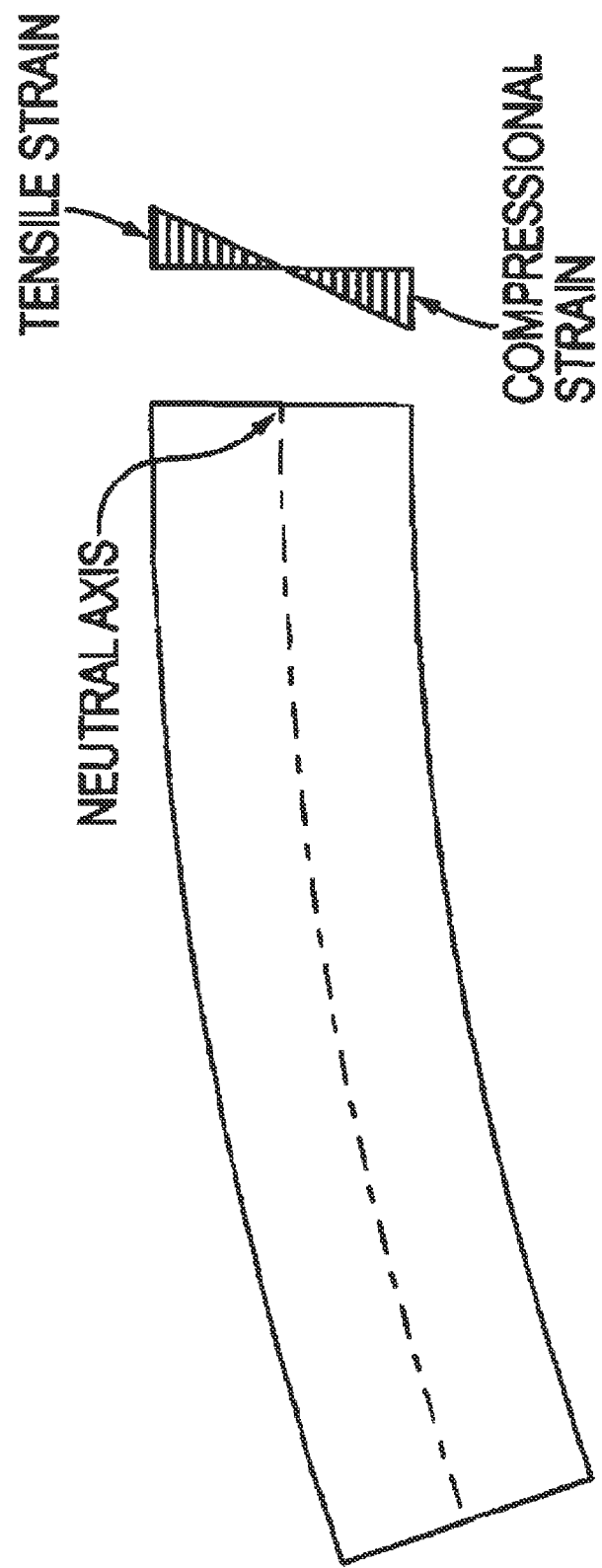
FIG. 7 is a stress diagram illustrating exemplary stress forces undergone by a streamer cable.

Referring to FIG. 7, the maximum bending strain over the cross section for the cable 100 will be influenced by the cable and spool diameter. In one example, if the cable diameter is 50 mm and the spool diameter is 1400 mm, the maximum bending strain can be calculated as 3.44% at the outermost portion of the cable (25 mm out of center). Such strain will be realized as compression and tensile strain over the cross section of the cable 100. Compression and tensile strain experienced by the wires 114 can lead to undesirable wire breaks.

The manufacturing process associated with assembling the streamer cable 100 according to the present disclosure can thus be simplified. In particular, by placing the wires 114 through the inline channel 112, the sensors 106 and the wires 114 can be connected, tested and pre-made before the step of assembling the sensors and the core 110 together. As such, if the polymer body 104 was manufactured in two halves (or other multiple) that are then secured together during manufacturing. Alternatively, the sensor network (the sensor 106, the wires 114 and the electronics 108) may be pre-assembled inside a portion of the polymer body 104 and then later assembled together with core 110.

FIGS. 2-7 and the associated description describe solid streamers that may be used in accordance with the present invention. In embodiments of the invention, solid streamers comprising a seismic streamer at least partially filled with a gel, thermoplastic elastomer, polymer or the like may be used.

For example, solid streamers comprising thermally reversible gels, such as Kraton G or the like may be used in embodiments of the invention. In such embodiments, the thermally reversible gel may be used to fill the empty spaces within the streamer. The inserted gel can be removed for maintenance purposes.

The solid streamers may comprise existing streamer designs with a gel, thermoplastic elastomer, polymer or the like being used to fill the streamer instead of kerosene or a liquid. In some embodiments, the solid streamer may comprise a material that maintains a solid form when released into a body of water such that the material may be reused, may block leakage from the streamer and/or may limit any harmful environmental effects (unlike liquid materials that may create a sheen/slick on the water surface and/or adversely interact with the marine environment). In some applications, the material may be a non-environmentally harmful material. In some embodiments, the material can include a thermo-gel in combination with an isoparaffin. In some embodiments, the thermo-gel may include an oil gel and/or a polymer gel. For example, the thermo-gel can be a Kraton® thermo-gel. In some embodiments, the isoparaffin can include Isopar fluid. Various combinations of a thermo-gel and an isoparaffin can be used. For example, the material can include 5, 10, 15, 20, 25, 30, 35, or 40 wt % of Kraton thermo-gel that can be used in conjunction with 95, 90, 85, 80, 75, 70, 65, 60 wt % isoparaffin.

Figure 8:
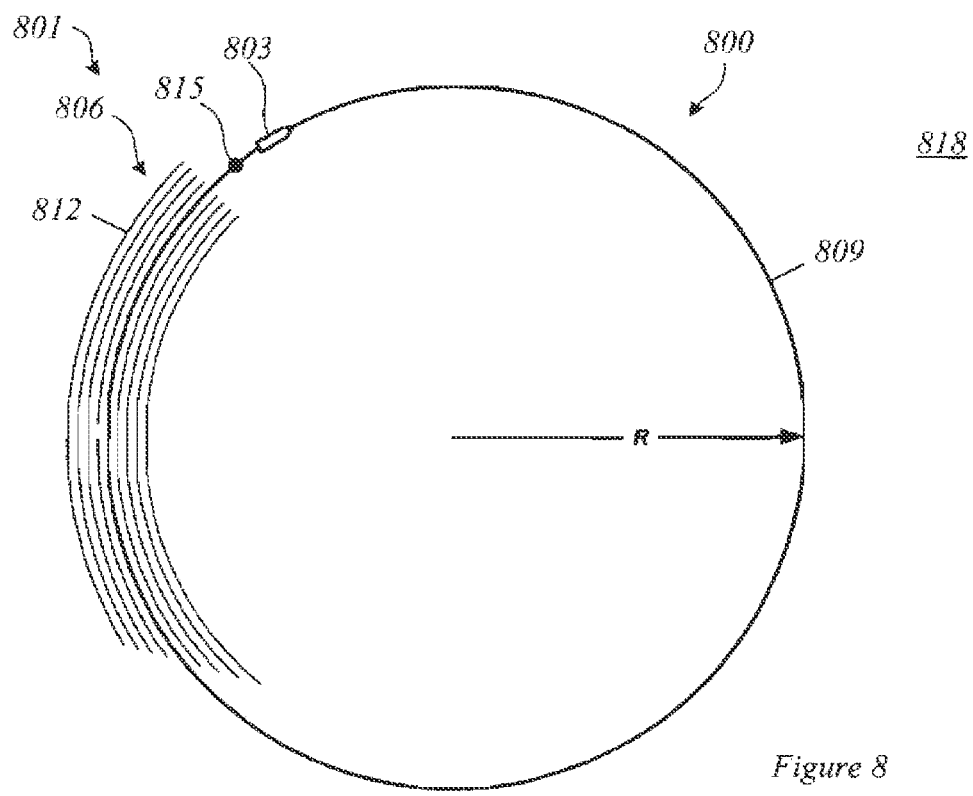
FIG. 8 is a plan, overhead schematic view of a coil shoot according to some embodiments of the invention.
Figure 9A:
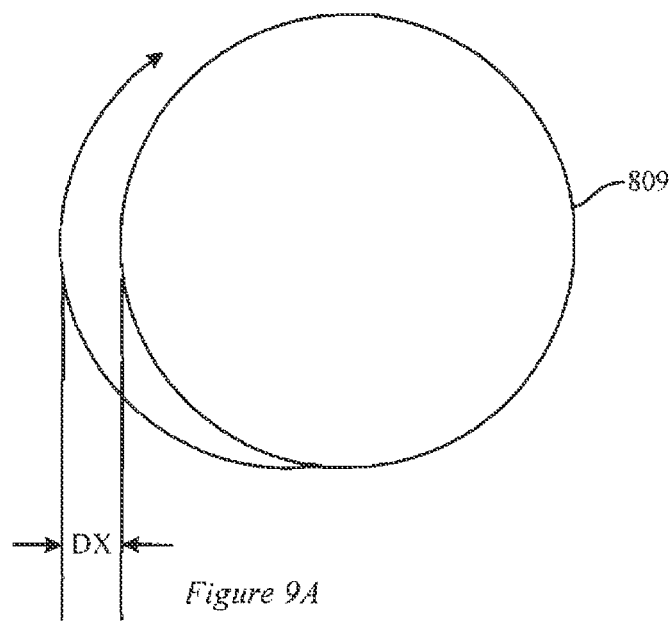
FIGS. 9A-C are computerized renditions of a plan view of the survey area covered by generally circular sail lines progressing over time according to some embodiments of the invention.
Figure 9B:
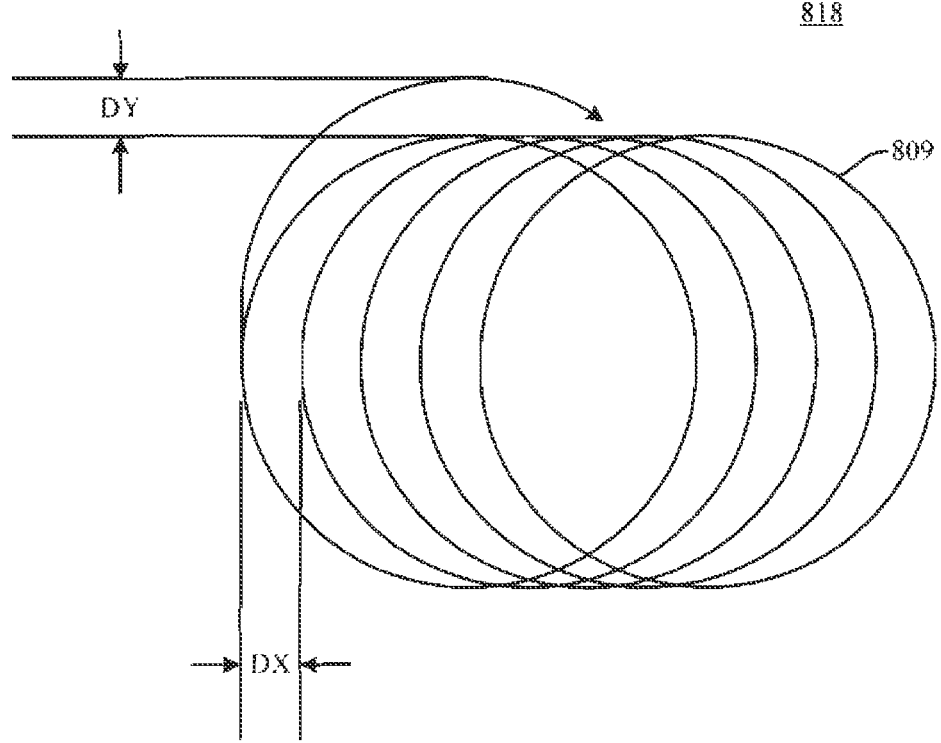
Figure 9C:
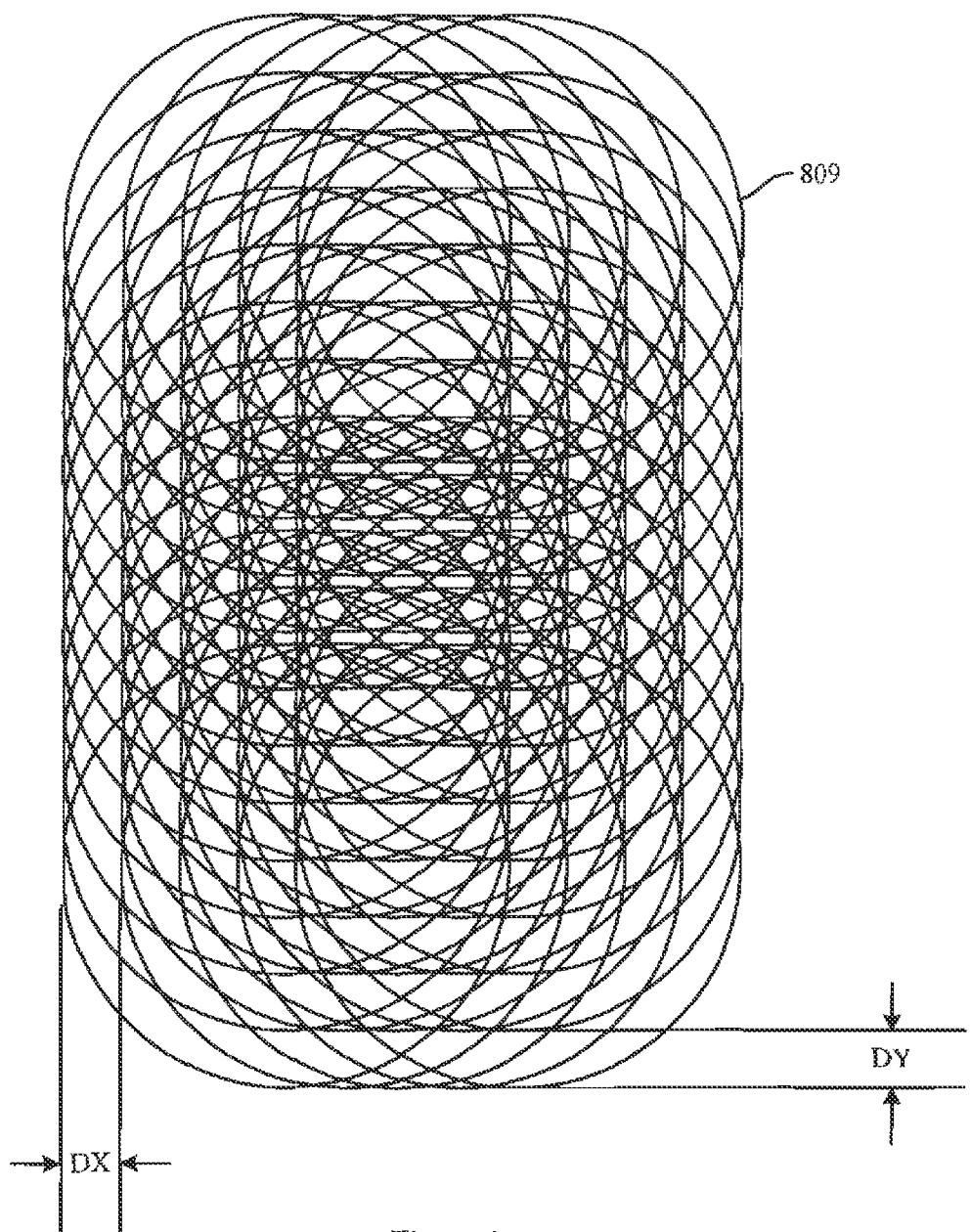
Figure 10:
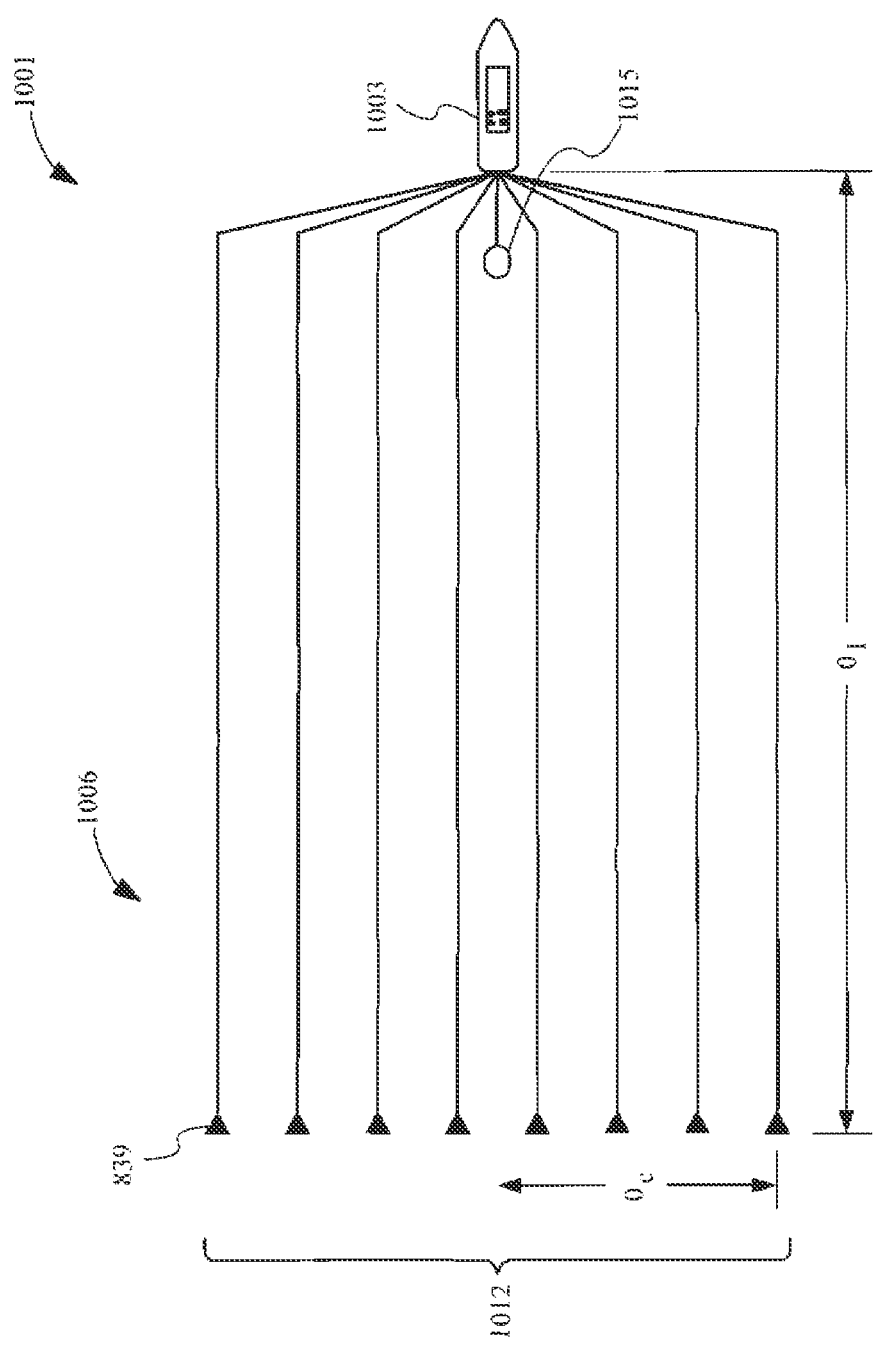
FIG. 10 is a plan, overhead view of a survey spread according to some embodiments of the invention.

Turning now to coil shooting, FIGS. 8-10 generally illustrate a coil shoot, towed-array marine seismic survey and one particular apparatus by which it may be performed.

FIG. 8 depicts a portion of a towed-array in a marine seismic survey 800 according to some embodiments of the invention. The seismic survey 800 can include a seismic spread 801, which comprises a survey vessel 803 towing an array 806 on a generally advancing curved path over sail line 809. In the illustrated embodiment, the array 806 includes a plurality of streamers 812 and a source 815. Sail line 809 does not have a tangible manifestation, and that sail line 809 in the drawing graphically represents that which is intangible in practice. Seismic survey 800 is being conducted in a survey area 818.

The sail line 809 may not be truly circular. Once the first pass is substantially complete, the survey 800 can move the spread 801 slightly in either or both the x-direction (horizontal) a distance of DX or the y-direction (vertical) a distance of DY, as illustrated in FIGS. 9A-9C. While the x-axis and the y-axis are defined relative to the plane of the drawing, in practice they can be arbitrary.

FIGS. 9A-9C are plan views of progressing circular sail lines 809 of seismic spread 801 shown in FIG. 8. The sail lines 809 are generally followed by a boat pulling seismic streamers. The streamers can progress along either of both the x-axis and the y-axis over time during a coil shooting and recording survey. While sail lines 809 are generally circular, various other curved paths may be taken such as ovals, and the like. Sail lines 809 are generally circular, but within the nautical limits to command a ship in such a manner and on the influences of current and the environment on the boat following sail lines 809. The displacement from circle to circle is DY in the vertical direction and DX in the horizontal direction. In FIG. 9A a full generally circular sail lines 809 cover survey area 818. After completing a complete circle, the streamers are towed in another circle displaced by some distance, DX. After the streamers are towed in a number of progressing circles along the x-axis, the streamers are then displaced some distance, DY, in the y-axis as shown in FIG. 9B. After the y-axis displacement the streamers can be pulled in a number of circles along the x-axis back toward the first circle. This alternating pattern for x-axis and y-axis displacement can continue until the sail line pattern shown in FIG. 9C is formed.

Still referring to FIGS. 8 and 9A-9C, when a first generally circular sail line 809 is completed vessel 803 can move along the tangent with a certain distance, DX, in the horizontal direction, and starts a new generally circular sail line 809 as shown in FIG. 9A. Several generally circular sail lines 809 may be traversed until the survey border is reached in the horizontal direction. A new series of generally circular sail lines 809 may then be acquired in a similar way, but the origin will be moved with DY in the vertical direction. This way of shooting continues until the survey area is completely covered.

FIG. 10 is survey spread 1001 in a plan, overhead view according to some embodiments of the invention. Survey spread 1001, for example, can be survey spread 801 shown in FIG. 8. In some embodiments survey spread 1001 can include a towed array 1006, towed by a survey vessel 1003. The towed array 1006 can include any seismic array or streamer described throughout the disclosure. A computing apparatus can control seismic spread 1001 and can be located on-board the survey vessel 1003. The towed array 1006 can include any number of streamers. In the figure, eight streamers 1012 are shown. A seismic source 1015 is also included. Survey spread 1001 is shown after deployment but before embarking upon the sail line 809, shown in FIG. 8. Consequently, the streamers 1012 are shown in a straight arrangement rather than curved one of FIG. 8. The towed array 1006 can have a width, $W_c$, and a length, $L_1$.

The array 1006 also contains a number of positioning elements. For example, the array 1006 can include steering devices known as "deflectors," "birds" and/or other steering devices. One suitable type of steerable bird is disclosed in U.S. Pat. No. 7,203,130, incorporated herein in its entirety of all purposes. Other types of positioning elements are known to the art and may be used in various embodiments. For example, a positioning element comprising a ducted body is disclosed in U.S. Pat. No. 7,377,224, incorporated herein in its entirety of all purposes. Some of these positioning elements are "steerable," meaning that they can steer themselves and, hence, a part of the array 1006, to a desired position. In the illustrated embodiment, as will be discussed in further detail below, the birds can be steerable in both depth and crossline directions to help properly position other elements of the array 1006 and maintain the shape thereof.

Figure 11:
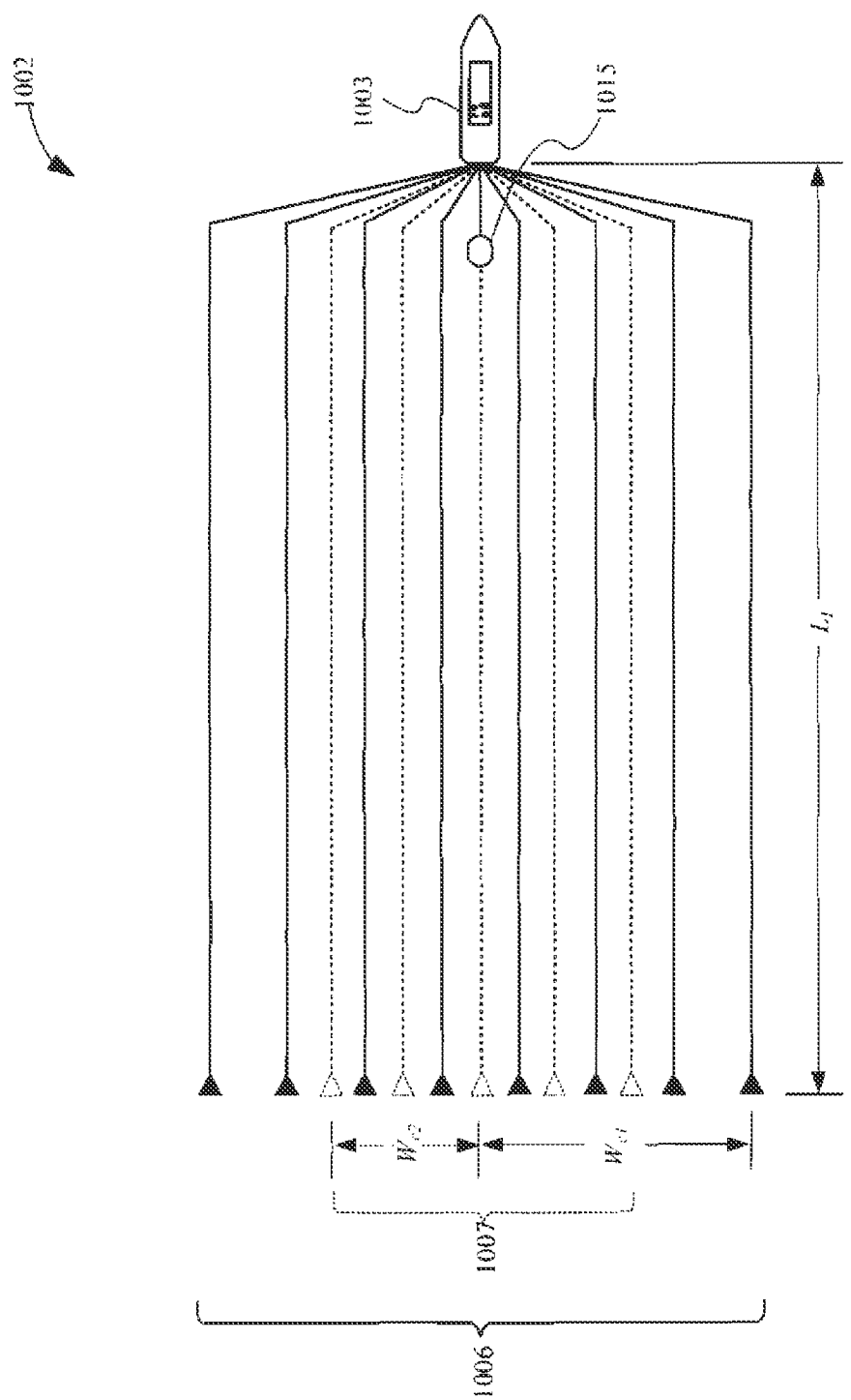
FIG. 11 is a plan, overhead view of a two-depth survey spread according to some embodiments of the invention.

FIG. 11 is a survey spread 1002 in a plan, overhead view similar to survey spread 1001 shown in FIG. 10. In this embodiment survey spread 1002 includes two towed arrays. A first towed array 1006 is shown with solid lines, and a second towed array 1007 is shown with dotted lines. The second towed array 1007 can be towed at a second depth that is deeper than the depth of the first towed array. In some embodiments, the second towed array 1007 can cover a surface array that is smaller than first towed array 1006. For instance, the width, $W_{c2}$, of the second array 1007 is smaller than the width, $W_{c1}$, of the first array 1006.

Figure 13:
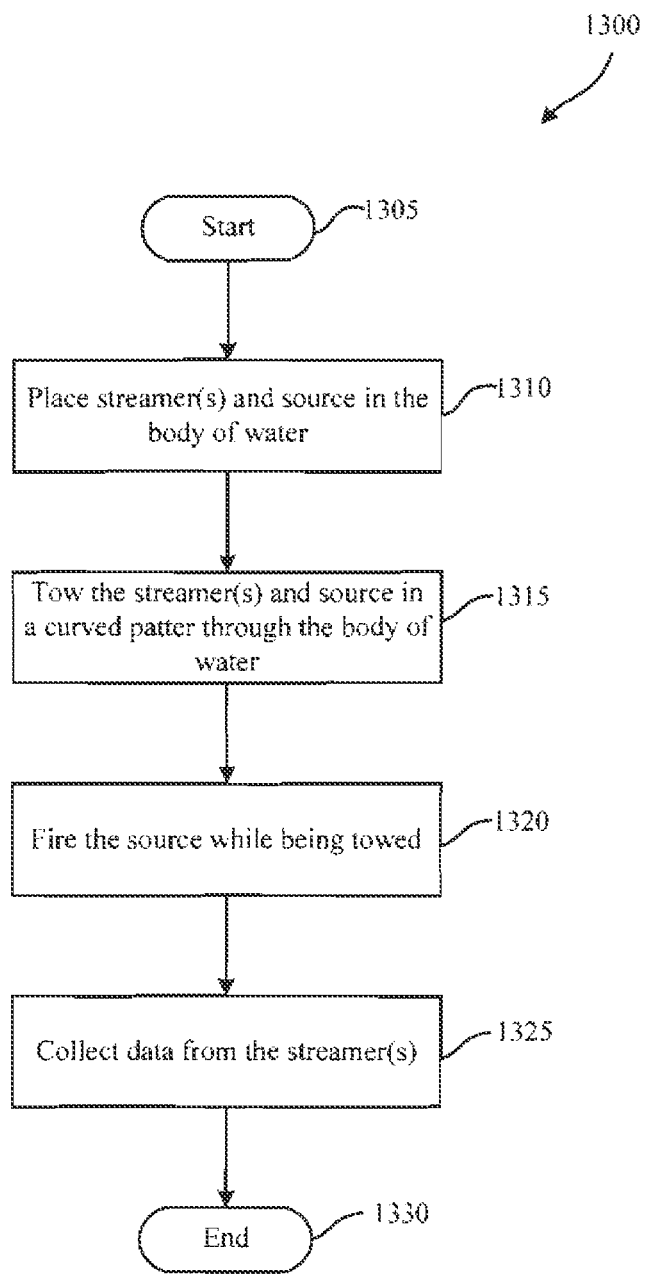
FIG. 13 is a flow chart of a process for using solid streamers in a curved pattern according to some embodiments of the invention.

FIG. 13 shows a side view of a marine seismic data acquisition system 31, which may be similar to the data acquisition system illustrated in FIG. 2 along with second towed array 1007 towed at a second depth deeper than the first depth of the first towed array 1006. The second towed array 1007 may include a set of seismic sensors 38.

Figure 12:
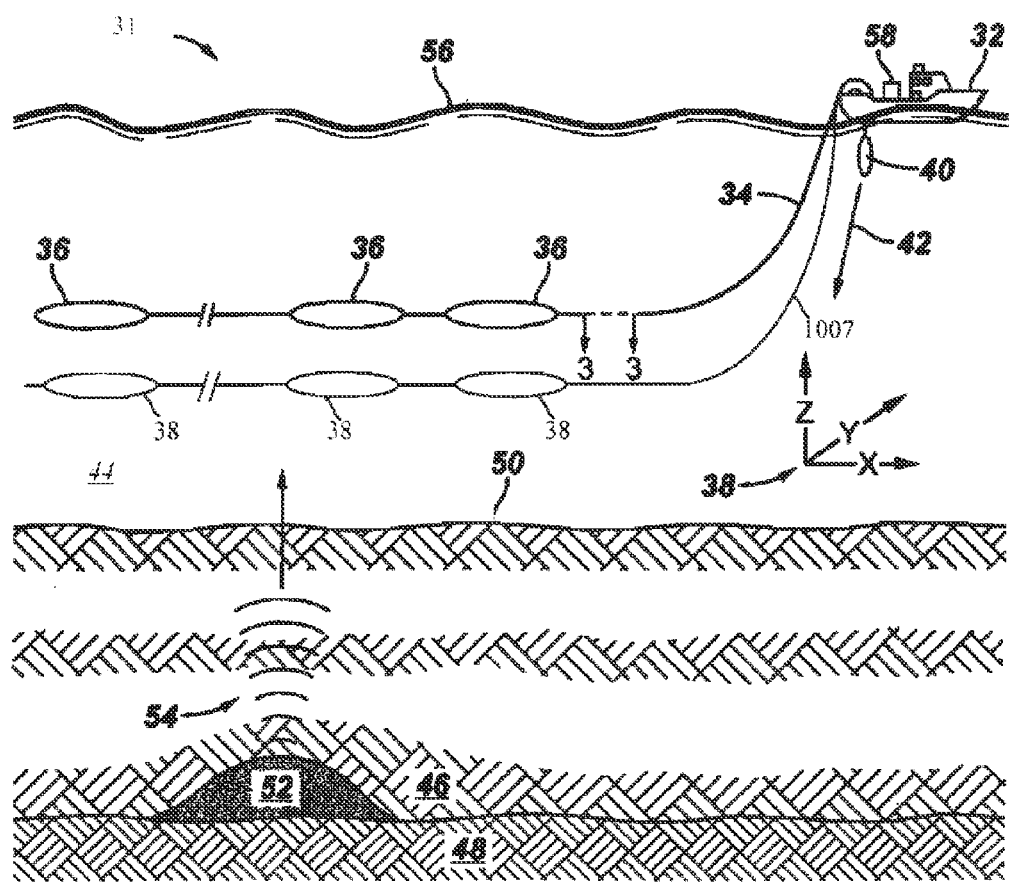
FIG. 12 is a diagram of a two-depth marine seismic data acquisition system according to some embodiments of the invention.

In some embodiments of the invention, the solid streamers are used in an over/under towing arrangement as shown in FIG. 12. In marine seismic acquisition, towing a streamer at a shallow depth makes the acquired data susceptible to environmental noise. In contrast, deep sources and/or deep streamers enhance the low frequencies, but attenuate the high frequencies. In addition, the data recorded via a deep tow have a higher signal-to-noise ratio (S/N) due to the more benign towing environment. A conventional towed-streamer survey design therefore, attempts to balance these conflicting aspects to arrive at a tow depth for the sources and cables that optimizes the bandwidth and signal-to-noise ratio of the data for a specific target depth or two-way travel time, often at the expense of other shallower or deeper objectives.

An over/under, towed-streamer configuration is a method of acquiring seismic data where cables are typically towed in pairs at two different cable depths, with one cable vertically above the other. The depths of these paired cables are typically significantly deeper than would be used for a conventional towed-streamer configuration. In conjunction with these paired cables, it is possible to acquire data with paired sources at two differing source depths.

In some embodiments, sparse-over/dense-under acquisition, the number of active receivers or receivers used at the deeper depth can be lower than the number of active receivers or receivers used at the shallower depth. In FIG. 11, for example, first streamer array 1006 (over streamers) includes 8 streamers and second streamer array (under streamers) includes 5 streamers. Any combination of over/under streamer numbers can be used. The density does not have to be a volume density and/or amount of streamers used at the different depths, it can equally be an area density, e.g., the number of active receivers with a given streamer or shot line spread. In the case of a dual streamer over/under configuration for a 2D survey the density can be interpreted as a line density of active receivers.

Sparse-over/dense-under acquisition may provide a method of generating a marine geophysical data set representing signals reflected from subterranean features, the signals having a survey bandwidth, wherein with the survey bandwidth there is one cross-over or transition frequency below which the data set is based on receiver signals obtained from a second depth and receiver signals obtained from a first depth are muted and above which the data set is based on receiver signals obtained from the first depth and receiver signals obtained from second depth are muted.

The seismic data recorded by the over/under towed-streamer configuration are combined in data processing into a single dataset that has the high-frequency characteristics of conventional data recorded at a shallow towing depth and the low frequency characteristics of conventional data recorded at a deeper towing depth. This combination process is commonly referred to in the geophysical literature as deghosting, as it effectively removes the so-called ghost notches from the receiver response.

FIG. 13 is a flowchart of process 1300 for performing marine seismic acquisition according to some embodiments of the invention. Process 1300 starts at block 1305. At block 1310 a solid seismic streamer(s) and a source is placed in a body of water. The solid streamer(s) and source are towed behind a vessel in a body of water and configured for receiving seismic signals generated by a seismic source in block 1315. As described above, the solid streamer(s) may be a seismic streamer(s) that is filled with a solid—a gel, thermoplastic elastomer, polymer and/or the like. The solid streamer(s) may also be towed in a curved pattern within the body of water. The curved pattern can include any full or partial circular or oval pattern. At block 1320 the source can be fired and data can be collected from the streamers at block 1325. Process 1300 can continue steps 1320 and 1325 for a period of time to collect multiple data sets. Process 1300 ends at block 1330.

Figure 14:
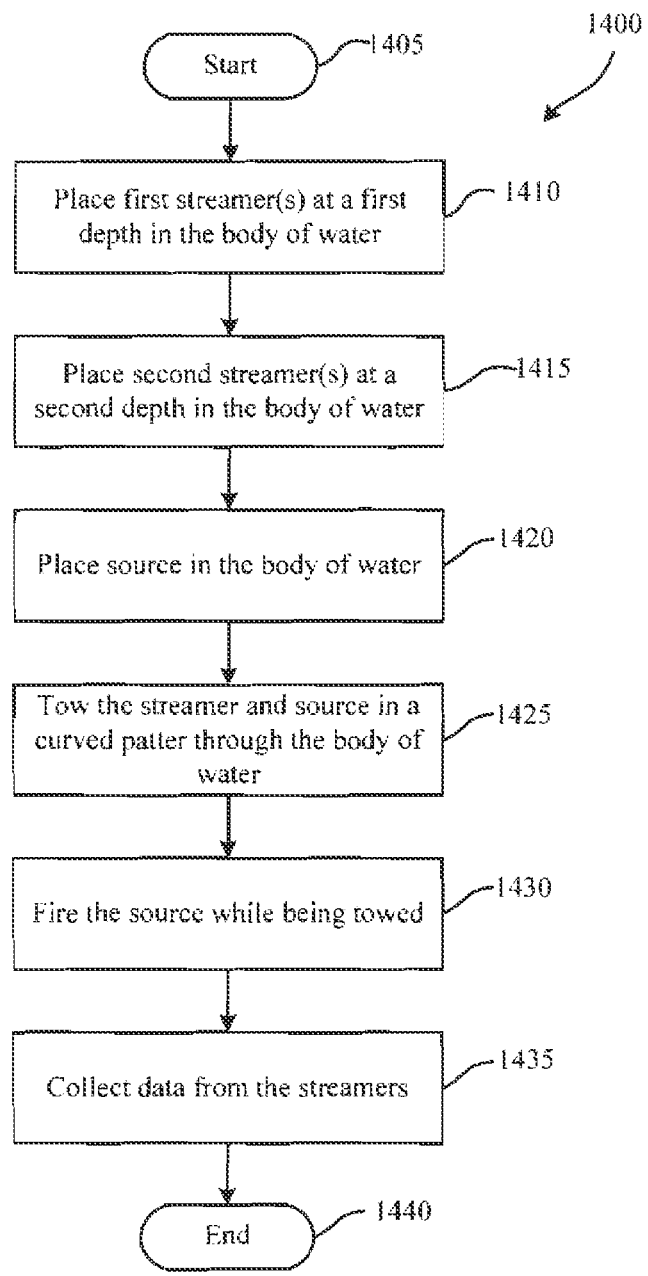
FIG. 14 is a flow chart of a process for using solid streamers in two depths in a curved pattern according to some embodiments of the invention.

FIG. 14 is a flowchart of process 1400 for performing marine seismic acquisition according to some embodiments of the invention. Process 1400 starts at block 1405. At blocks 1410, 1415, and 1420 a first streamer(s), a second streamer(s) and a source are placed in a body of water. The first streamer(s) can be placed in the body of water at a first depth. And the second streamer(s) can be placed in the body of water at a second depth. The solid streamers and source are towed behind a vessel in a body of water and configured for receiving seismic signals generated by a seismic source in block 1425. As described above, the first and/or second solid streamer(s) may be a seismic streamer(s) that is filled with a solid—a gel, thermoplastic elastomer, polymer and/or the like. The first and second solid streamer(s) may also be towed in a curved pattern within the body of water. The curved pattern can include any full or partial circular or oval pattern. At block 1430 the source can be fired and data can be collected from the streamers at block 1435. Process 1400 can continue at steps 1430 and 1435 for a period of time to collect multiple data sets. Process 1400 ends at block 1440.

In some embodiments of the invention, the solid seismic streamers are used in a shooting (e.g., a coil shooting that includes a curved path) as described above. In a coil shooting the solid seismic streamers are towed in a somewhat circular or similar pattern through the body of water. As a result of the circular-type towing of the solid streamers through the body of water, a shear, stress and/or pressure may be developed across the solid material. In some embodiments of the invention, the application of shear, stress and/or pressure generated across the solid streamer from the circular-type pattern on the solid material, the solid material, for example, being viscoelastic and comprising a gel, thermoplastic elastomer, polymer, cross-linked polymer, thermally reversible gel, permanent gel and/or the like, can cause a change in the physical properties of the solid material. For example, the shear generated by the coil shooting may change the viscosity, attenuation coefficient and/or the like of the material.

In some embodiments of the invention, the change in the physical properties of the solid streamer material may be used so that the solid streamer material acts as a noise filter. In some embodiments of the invention, a coil shooting with a solid streamer is performed and the synergistic effect of the combination provides for an improved received seismic signal, an increase in signal to noise ratio and/or the like.

In some embodiments of the invention, modeling, experimentation, processing of data, prior use and/or the like may be used to determine the effect of the stress on the attenuation of seismic signals, acoustic signals and/or the like passing through one or more of the solid streamer materials. In one embodiment, a solid streamer material may be selected for the solid streamer based on the results of the modeling, experimentation, processing of data, prior use where the solid streamer material provides for a desired attenuation of the received signal. The physical effect of the stress on the solid streamer material may be non-linear so, in some embodiments of the invention, may affect noise differently from the seismic signal received by the solid streamer.

In some embodiments of the invention, the effect of stress on the solid streamer material and/or the value of the stress for a coil shooting pattern may be used to process seismic data from the signal received by transducers in the solid streamer after the signal has passed through the solid streamer material. Merely by way of example, the known effect of shear stress, resulting from the curved motion of the solid streamer through the body of water in the coiled shooting, on the transmission of a seismic signal through the solid streamer material may be applied in the processing of the seismic data obtained from the solid streamer. For example, transmission properties of the seismic signal through the solid streamer material may be modeled, experimentally measured and/or the like for the applicable shear stresses.

As described herein, solid streamers may provide for seismic data acquisition and may be tuned, by adjusting the properties of the solid material, to the conditions surrounding the solid streamer. Moreover, unlike prior streamers, which use an essentially Newtonian fluid, such as kerosene or the like, solid streamers may react differently with regard to seismic data acquisition in accordance with conditions surrounding the streamer and/or the towing pattern/depth of the streamer. Applicants have determined that whereas the differing in response of the solid streamers to different conditions may be considered an impediment to using solid streamers in an over-under configuration and/or a coiled shooting seismic survey, the differing response may in embodiments of the present invention be effectively "tuned" for use in the over-under configuration and/or the coiled shooting seismic survey. In embodiments of the present invention, the differing response obtained from a solid streamer used in the over-under seismic streamer configuration and/or from a solid seismic streamer used in the coiled shooting seismic survey may be accounted for and/or attenuated in the processing of the obtained seismic data.

Hence, according to a first aspect of the invention there is provided a method of performing a geophysical survey, comprising the moving of solid streamers through a body of water in at least two different depths and using said solid streamers to record within a survey frequency bandwidth geophysical signals as reflected from subterranean features. In one aspect, the solid streamers are used in a sparse-over/dense-under acquisition configuration. In some embodiments of the invention, the solid streamers may be used to collect data at a shallow depth at one temporal location and the solid streamers may be used to collect data at the deeper depth at a different temporal location. In certain aspects, the temporal location may be separated by seconds, minutes, hours, days, months or even years.

In a method according to some embodiments of the invention, a first depth may be chosen for towing the solid streamer such that the upper limit of the practical survey bandwidth is closer to a first ghost notch than to a second ghost notch in the spectral response at the first depth and a second depth may be chosen such that the frequency of a first maximum in a spectral response at the second depth is 90 percent or less of the frequency of a first maximum in a spectral response at the first depth and the wavefield is effectively sampled at a lower density at the second depth than at the first depth.

The spectral response or response as referred to herein is the depth dependent spectrum of an up-going plane wave with vertical incidence interfering with the down-going wavefield as reflected from the sea-surface or any equivalent thereof. This spectral response is based on the constructive and destructive interference of the up- and down-going wavefield at the depth in question. Incidence angles other than vertical can be considered without changing the basic shape of the response spectrum.

Because solid streamers may acquire seismic data differently at the different depths and effects such as temperature or the like may affect the interaction of the solid material with seismic signals and/or noise acquired at the solid streamer, knowledge of the difference in response of the solid streamers at the different depths may be used to process the seismic data acquired in an over-under seismic acquisition. For example, the difference in response of the solid seismic streamers at the different depths may be used to determine noise content in the acquired seismic data. In another aspect of the invention, knowledge of the difference in response of the solid streamers at the shallow and deep depths—which knowledge may be determined theoretically, by experimentation, by prior use of the solid streamers, by computer modeling and/or the like—may be used in the processing of the acquired seismic data such that the difference in response of the solid seismic streamers at the different depths is included/accounted for in the processing of the seismic data field determined from the seismic data acquired at the shallow and deep depths. In some embodiments, a conventional, non-solid streamer(s), may be towed at one depth and a solid streamer(s) towed at the other depth and a combined seismic data acquisition may be determined by combining the data collected by the different streamers.

In some embodiments of the invention, a sensor, such as for example a temperature sensor, may be coupled with the solid streamers at the different tow depths to determine a difference in conditions applicable to the solid streamers at the different depths. This difference in conditions as sensed by the sensor may then be used to process a combined seismic data signal from the outputs of the solid streamers at the different depths.

For example, in conventional over/under processing of streamer signals, an effective response curve for the streamers is determined as being essentially the average of the two response curves of the over and the under streamers over the bandwidth of the survey. As a result of this over/under combination the effects of the ghost notches are cancelled from the receiver response, thus amounting to a deghosting of the received geophysical signals.

In sparse-over/dense-under acquisition using solid streamers, the signals from the shallow solid streamer(s) may be effectively muted from the lower limit of the bandwidth up to a transition or cross-over frequency. In the frequency interval from the transition frequency to the upper limit of the survey bandwidth the response of the deep solid streamer is effectively muted and the response of the shallow solid streamer dominates the overall response of the survey. The combination of the shallow and deeper spectra can hence be carried out through simple surgical mute and replace after re-daturning to the same (arbitrary) depth.

In some embodiments, for example, for an over-under solid streamer configuration or for a solid streamer used in a coiled shooting seismic survey, a gel may be added to the streamers to enhance the function of the seismic sensors, such as by attenuating noise signals received by the hydrophones disposed within the streamer body. Stated differently, the gel may improve the function of the seismic sensors by reducing a signal-to-noise ratio so that signal noise (e.g., environmental noise, noise crated by the streamer) or other interference are reduced and the sensed input is reflective of or otherwise includes more of the desired seismic signal. In embodiments of the present invention, the gel may act as a filter for noise signals so that reception of the desired seismic signal is improved. In one embodiment, a gel having a complex viscosity of at least 50 Pascals (Pa) is added to the streamers. In another embodiment, a gel having a complex viscosity of between about 50 Pa and 1500 Pa, between about 100 Pa and 1000 Pa, or between about 100 Pa and 800 Pa is added to the streamers. These viscosities have been found to tune the seismic streamer so that the streamer incorporating such a viscosity gel provides an improved signal-to-noise ratio, with respect to other gel viscosities or liquid filled streamers In embodiments of the present invention, the gel may include a concentration of a thermo-reversible polymer between the range of about 5% and about 25% by weight, between about 10% and about 20% by weight, and more commonly about 15% or more by weight (where the concentration is the ration of the amount of the thermo-reversible polymer compared to the amount of fluid in which it is mixed. In aspects of the present invention, the fluid may comprise a hydrocarbon or the like. As described herein, the thermo-reversible polymer gels may allow a liquid gel to be applied to the streamers and subsequently cooled so that the gel solidifies. Similarly, the solidified gel may be reheated to liquefy the gel so that the gel may be removed and the like.

The thermo-reversible polymer may be a block copolymer and the gel may be more environmentally friendly than conventional fillers used to fill seismic streamers, such as kerosene. In some aspects, the thermo-reversible polymer may be dissolved in environmentally friendly hydrocarbons such as naturally occurring hydrocarbons or the like. As such, leakage of the gel from the streamer may result in less environmental damage than conventional fillers, such as kerosene or the like. In embodiments of the present invention, the gel may be a visco-elastic gel having a bulk modulus that provides that the gel is essentially non-compressible. For example in aspects of the present invention, the gel may comprise a viscoelastic gel having a bulk modulus of the order of about 1.6 GPa (gigapascals), to provide that the gel is non-compressible. This may allow seismic waves to be easily transmitted through the gel to the sensors within the streamer.

The solidified gel may also have the same or similar complex viscosity values as the liquefied gel (i.e., a complex viscosity of at least 50 Pa and more commonly between about 50 Pa-1500 Pa, 100 Pa-1000 Pa, 100 Pa-800 Pa, and the like). In one embodiment, the gel may have or exhibit a shear modulus of between about 196 Pa and 196 kPa (kilopascals). In another embodiment, the gel may have or exhibit a shear modulus of between about 1.9 kPa and 78 kPa, 1.9 kPa and 10 kPa, and the like. The shear modulus or stiffness determines, in part, the speed of sound through the gel medium. In some embodiments, the gel shear stiffness or modulus, or the complex viscosity, may be tuned so that it may be determined when the desired signal and the noise signal will or should arrive at the hydrophone disposed within the seismic streamer. For example, it may be determined, measure, or calculated that the noise signal takes longer to arrive at the hydrophone than the desired signal or vice versa. Accordingly, in some embodiments, the hydrophone, or some other component or application, may be programmed to be dormant, or otherwise not collect and/or transmit data, when the noise signal arrives. Such programming of the hydrophone or another component may, thus, further filter noise signals.

In another embodiment, the stiffness of the streamer skin may be increased and/or tuned depending on the gel used as the streamer filler in order to further filter noise signals and thereby improve the signal-to-noise ratio. For example, in some embodiments, stiffer or more rigid streamer skin materials may be used, or thicker/thinner streamer skins may be used, which function with the gel to filter noise signals. In one embodiment, the streamer skin stiffness is selected to be similar to the gel's stiffness. In this way, in aspects of the present invention the streamer skin and the gel may be selected to have matching stiffness and, as a result, the boundary conditions between the two materials are lessened.

Gels having the above described complex viscosity and/or shear modulus properties may be ideal for attenuating noise signals and/or increasing a signal-to-noise ratio. In attenuating noise signals, these gels may filter noise across multiple frequency ranges. For example, in FIGS. 15A & B, graphs are illustrated showing the effects gels have on signals in the low frequency range. Specifically, the Figures chart the effects six different gels have on low frequency signals. Lines 1 and 2 in FIG. 15A and lines 1-4 in FIG. 15B represent gels having the complex viscosity and/or shear modulus properties in accordance with embodiments of the present invention, as described above, while the other lines (i.e., lines 3-6 in FIG. 15A and lines 5 and 6 in FIG. 15B) represent gels having complex viscosity and/or shear modulus properties outside these described ranges.

Figure 15A:
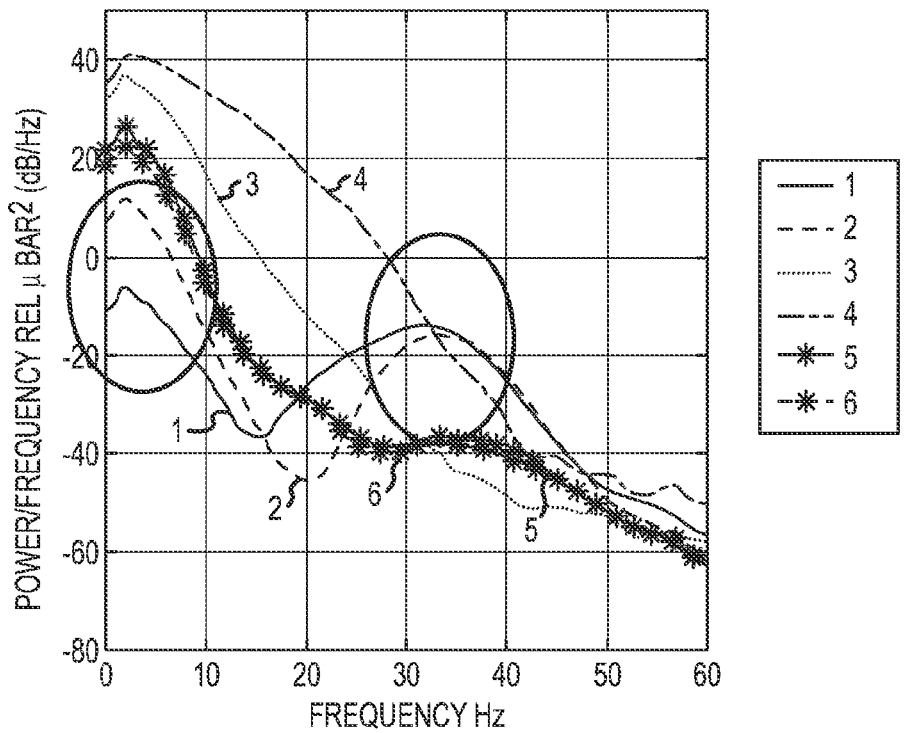
FIGS. 15A and 15B show graphs that illustrate the effects of various gels on noise signals received at a hydrophone disposed within a seismic streamer according to some embodiments of the invention.
Figure 15B:
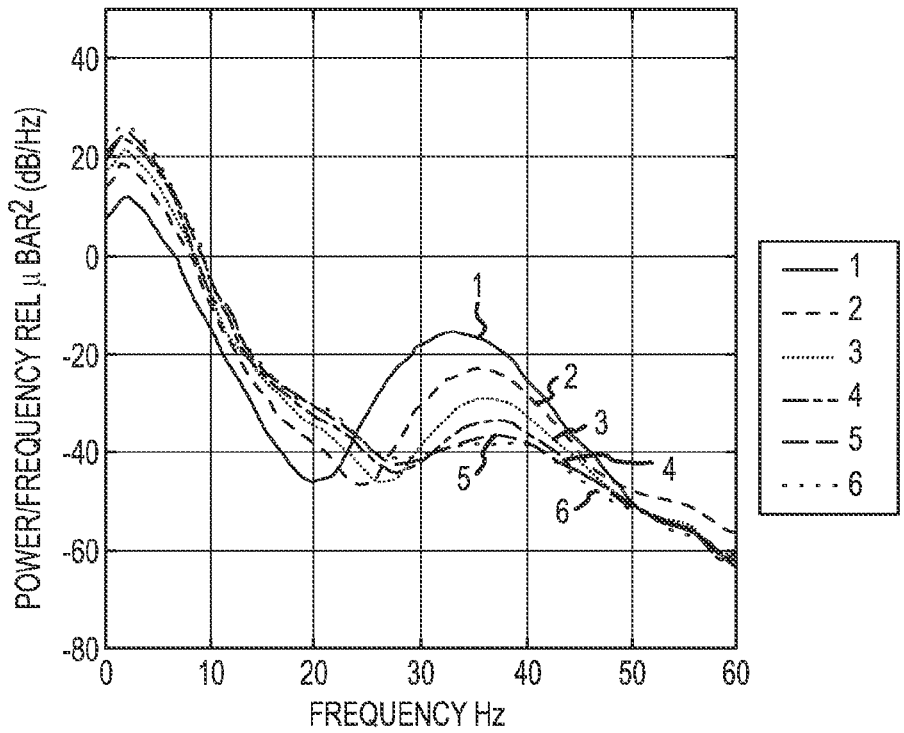

As shown in FIGS. 15A & B, all six gels are relatively able to attenuate, reduce, or otherwise filter noise signals in the frequency range of 0-10 Hz (i.e., the leftmost gray shaded area in FIG. 15A) as shown by the slight hump near the 3 Hz frequency range. Surprisingly, however, the gels having the complex viscosity and/or shear modulus properties described above (i.e., lines 1 and 2 in FIG. 15A and lines 1-4 in FIG. 15B) are also able to attenuate, reduce, or otherwise filter noise signals in the 20-50 Hz frequency range, and even more specifically in the 25-40 Hz or 30-40 Hz frequency range (i.e., the rightmost gray shaded area in FIG. 15A), as shown by the pronounced humps within those specified ranges. Noise signal attenuation appears to be most significant around 33-34 Hz. The gels having complex viscosity and/or shear modulus properties outside these described ranges—either above or below these ranges as illustrated by lines 3-6 in FIG. 15A and lines 5 and 6 in FIG. 15B—are significantly less able to effectively attenuate or reduce noise signals in the 20-50 Hz frequency range as shown by the relatively flat line response in these frequency ranges.

Because the gels, in accordance with embodiments of the present invention, provide that noise is attenuated, reduced, or otherwise filtered in several frequency ranges, the signal-to-noise ratio from seismic streamers filled with such gels is greatly improved. Accordingly, seismic streamers that include the gels described herein experience improved signal-to-noise ratio in these frequency ranges and are, thus, able to collect better data, which may enhance the ability to determine the sea floor structure and/or locate hydrocarbon deposits. This noise filtering effect of the gel may be most prominent when the streamers are being towed in coil shooting type patterns as described herein since, in some embodiments, data may be collected in the slightly higher frequency ranges during this process (i.e., within the 20-50 Hz range or higher). In some embodiments, the hydrophone or hydrophones of one or more streamers may be programmed to collect data in the 0-10 Hz range while the hydrophone or hydrophones of other streamers are programmed to collect data in the 20-50 Hz range. The streamers may be towed at different locations and/or different depths as described herein. In other embodiments, the hydrophones may collect data across both frequency ranges.

Figure 16:
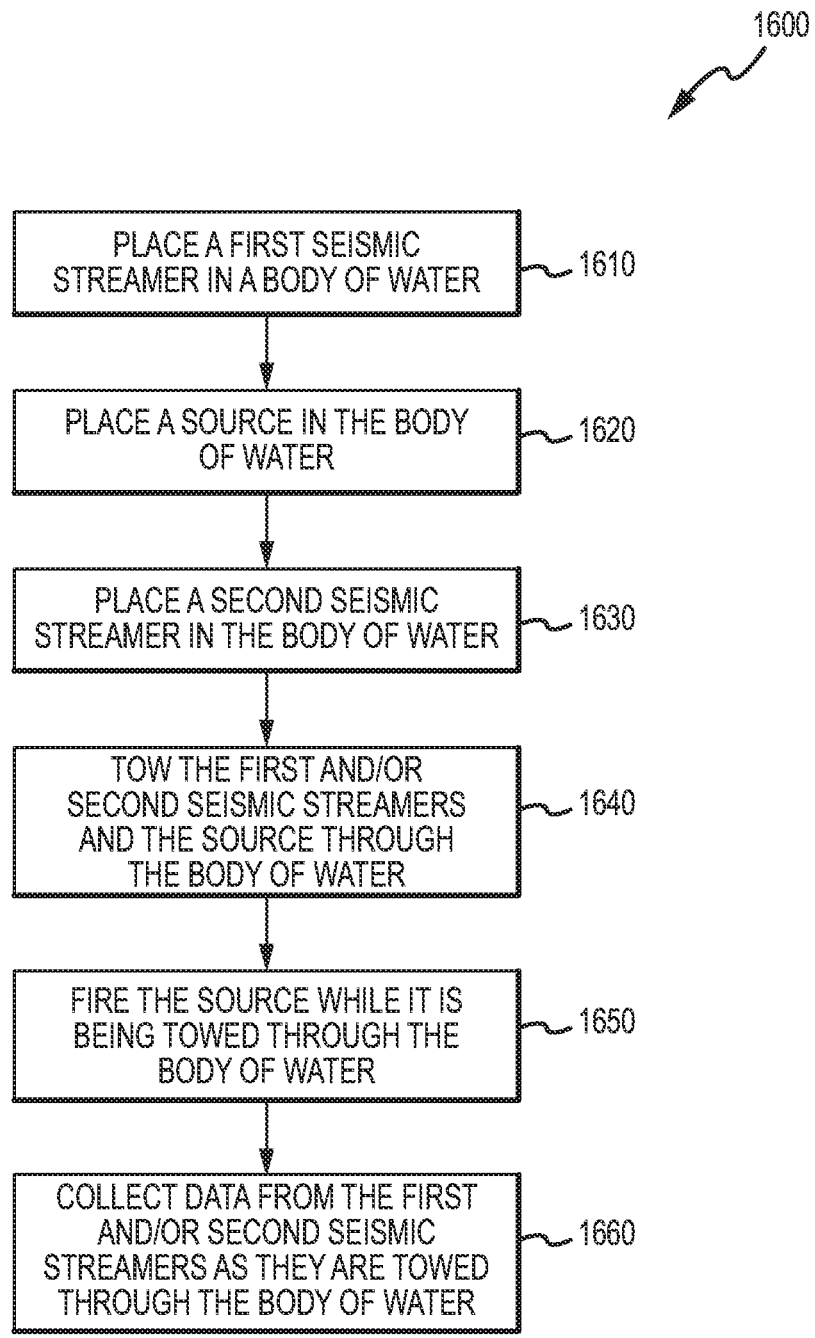
FIG. 16 is a flow chart of a process for attenuating noise during acquisition of marine seismic data according to some embodiments of the invention.

FIG. 16 is a flowchart of process 1600 for attenuating noise during acquisition of marine seismic data. At block 1610, a first seismic streamer is placed in a body of water. As described herein, the first seismic streamer may include a single streamer or, more commonly, a plurality of streamers. As also described herein, the first seismic streamer may include a streamer body having a length and a channel, a seismic sensor disposed within the channel of the streamer body, and a gel disposed within at least a portion of the channel. The gel may include a concentration of a polymer between the range of about 5% and about 25% by weight, 10% and about 20% by weight, and more commonly about or at least 15%. The gel may have a complex viscosity of at least 50 Pa, and more commonly have a complex viscosity in the range of about 50 Pa-1500 Pa, 100 Pa-1000 Pa, 100 Pa-800 Pa, and the like. The gel may also or alternatively have a shear modulus in the range of about 196 Pa-196 kPa, 1.9 kPa-78 kPa, 1.9 kPa-10 kPa, and the like.

At block 1620, a source is placed in the body of water. At block 1630, a second seismic streamer may optionally be placed in the body of water. The second seismic streamer may include a single streamer or, more commonly, a plurality of streamers. The second seismic streamer may also include a gel disposed within a portion of a channel of the second seismic streamer. In some embodiments, the gel may have a complex viscosity of at least 50 Pa that is different than the complex viscosity of the first seismic streamer. For example, the first seismic streamer may have a complex viscosity closer to 1000 Pa while the second seismic streamer has a complex viscosity closer to 100 Pa. This may allow the two streamers, or the plurality of streamers represented by the two streamers, to attenuate noise signals in different manners, thereby varying the data signals that are collected by the separate streamers and/or varying the frequency ranges in which the streamers effectively collect data.

At block 1640, the first seismic streamer, second seismic streamer, and/or the source are towed through the body of water. At block 1650, the source is fired while being towed through the body of water. At block 1660, data is collected from the first and/or second seismic streamers as they are towed through the body of water.

As described herein, the first and/or second seismic streamer may attenuate a noise signal of the data between the range of 0 to 10 Hz and also attenuate a noise signal between the range of 20 to 50 Hz. In another embodiment, the first and/or second seismic streamer attenuates a noise signal between the range of 25 to 40 Hz or 30 to 40 Hz. The first and/or second seismic streamers and the source may be towed in a curved pattern or coil shooting pattern as described herein, or in another non-curved pattern. In some embodiments, the noise filter effect of the gel may be more prominent when the streamer(s) are towed in a coil shooting pattern since data may be accumulated at a relatively high frequency during such a process. The gel may have significant noise reduction effects in such patterns when compared to conventional kerosene filled streamers.

Further, in some embodiments, the first streamer may be towed at a first temporal location and/or depth and the second streamer may be towed at a second temporal location and/or depth that is different than the first temporal location as described herein. The effect of the gel on the collected data may be processed for properties of the gel under an applied shear force.

Figure 17:
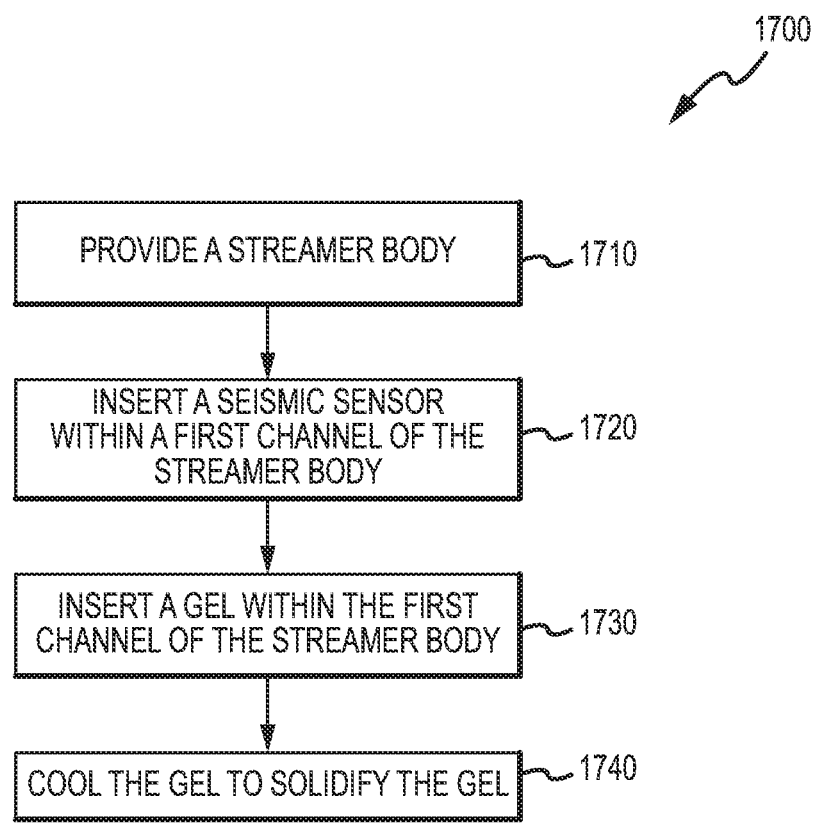
FIG. 17 is a flow chart of a process for manufacturing a seismic streamer for acquiring marine seismic data according to some embodiments of the invention.

FIG. 17 is a flowchart of process 1700 for manufacturing a seismic streamer for acquiring marine seismic data. The seismic streamer may have improved noise attenuating properties when compared to conventional seismic streamers. At block 1710, a streamer body may be provided. The streamer body may include a streamer body length, one or more channels, and a solid streamer core disposed within the one or more channels of the streamer body. At block 1720, a seismic sensor may be inserted within a first channel of the streamer body. At block 1730, a gel may be inserted within at least a portion of the first channel. In some embodiments, the gel may be a liquid gel that includes a concentration of a thermoreversible polymer between the range of about 5% and about 25% by weight or any of the other ranges described herein. The gel may also have a complex viscosity of at least 50 Pa, between the range of about 50 Pa and about 1500 Pa, or any of the other ranges described herein. When a liquid gel is used, the liquid gel may be cooled at block 1740 so that the liquid gel at least partially solidifies within the first channel. Using a liquid gel may allow the gel to be reheated, liquefied, and subsequently removed, after which, a new or additional gel may be added. The new gel may have different properties (e.g., a different complex viscosity and/or shear modulus) to allow data collected to be varied, or the streamer refilling process may simply involve replacing old gel. In some aspects, the gel may be selected so that the streamer is tuned for use in a specific location and/or specific conditions. For example, the gel may be configured so that it has a desired viscosity when incorporated in a streamer to be towed in a cold marine environment, such as for example a body of water in the Arctic. Alternatively, the gel may be configured to provide the advantageous noise properties described above when incorporated in a streamer to be used in warm condition, such as for example in a body of water close to the equator.

In some embodiments, the method may further include inserting a sensor within the portion of the first channel. The sensor may be configured to measure a property or properties of the gel (e.g., the viscosity of the gel) to ensure that the gel's property, or properties, is maintained or to allow parameters of the data collection process to be altered in response to a change in the gel's property or properties. In some embodiments, the gel may be replaced when the measured property changes beyond a defined point. Alternatively, the concentration of the gel and/or a pressure of the gel within the first channel may be adjusted in response to the change in the gel's property beyond a defined point. For example, in response to a change in the gel's viscosity, additional gel may be added to increase the gel concentration and/or to increase a pressure of the gel within the first channel to increase the gel's viscosity.

Any portion of the above described methods, or of any of the other embodiments described herein, may be performed via one or more instructions that are encoded on a computer readable medium as described herein and as known in the art. These instructions may cause a processor to perform one or more operations that enable the methods, or any portion thereof, to be performed, such as the above described operations involving measuring, determining, calculating and the like. The processor may be communicatively coupled with the various sensors, hydrophones, and/or other components described herein as is commonly known in the art and as described herein to perform one or more of the above described operations.

While the principles of the disclosure have been described above in connection with specific apparatuses and methods, it is to be clearly understood that this description is made only by way of example and not as limitation on the scope of the invention.

What is claimed is:

1. A method for manufacturing a seismic streamer for acquiring marine seismic data, the seismic streamer having improved noise attenuating properties, the method comprising:
   providing a streamer body comprising:
      a streamer body length;
      one or more channels; and
      a solid streamer core disposed within the one or more channels of the streamer body;
   inserting a seismic sensor within a first channel of the streamer body;
   inserting a liquid gel within at least a portion of the first channel, the liquid gel comprising a thermo-reversible polymer dissolved in a fluid, wherein a concentration of the thermo-reversible polymer dissolved in the fluid is between the range of about 10% and about 20% by weight of the gel, and wherein the liquid gel is configured to have a complex viscosity between the range of about 100 Pascals and about 800 Pascals; and
   cooling the liquid gel so that the liquid gel at least partially solidifies.

2. The method according to claim 1, wherein the concentration of the thermo-reversible polymer is about 15%.

3. The method according to claim 1, wherein the thermo-reversible polymer comprises a block copolymer.

4. The method according to claim 1, wherein the seismic streamer attenuates noise in the range of 0 to 10 Hz and in the range of 20 to 50 Hz.

5. The method according to claim 4, wherein the seismic streamer attenuates noise in the range of 30 to 40 Hz.

6. The method according to claim 1, further comprising inserting a sensor within the portion of the first channel, the sensor being configured to measure the viscosity of the gel.

7. A method for attenuating noise during acquisition of marine seismic data, comprising:
   placing a first seismic streamer in a body of water, the first seismic streamer comprising:
      a streamer body having a length and a channel;
      a seismic sensor disposed within the channel of the streamer body; and
      a gel disposed within at least a portion of the channel, the gel comprising:
   a thermo-reversible polymer dissolved in a fluid, wherein a concentration of the thermo-reversible polymer is in the range of about 5% and about 25% by weight of the gel and the gel is configured to have a complex viscosity of at least 50 Pascals;
   placing a source in the body of water; towing the first seismic streamer and the source through the body of water;
   firing the source while the source is being towed through the body of water; and
   collecting data from the first seismic streamer as it is towed through the body of water.

8. The method according to claim 7, wherein the first seismic streamer attenuates a noise signal between the range of 0 to 10 Hz and the range of 20 to 50 Hz.

9. The method according to claim 8, wherein the first seismic streamer attenuates the noise signal between the range of 30 to 40 Hz.

10. The method according to claim 7, wherein the first seismic streamer and the source are towed in a curved pattern or a non-curved pattern.

11. The method according to claim 10, wherein the first seismic streamer and the source are towed in a curved pattern, and wherein data is collected at a higher frequency such that the effect of the noise attenuating is greater.

12. The method according to claim 7, wherein the first streamer comprises a first plurality of streamers and wherein the method further comprises:
   placing a second seismic streamer in the body of water, wherein the second seismic streamer comprises a second gel disposed within a portion of a channel of the second seismic streamer and the second gel comprises a second complex viscosity of at least 50 Pascals and the second complex viscosity is different than the complex viscosity of the first seismic streamer so as to attenuate a noise signal of data in manner different than the first seismic streamer; and
   collecting data from the second seismic streamer as it is towed through the body of water.

13. The method according to claim 12, wherein the first streamer is towed at a first temporal location and the second streamer is towed at a second temporal location that is different than the first temporal location.

14. The method according to claim 7, further comprising filtering a noise signal by determining a period when a noise signal will arrive at a hydrophone and not collecting data during at least a portion of the determined period.

15. The method according to claim 14, wherein the hydrophone is directed, via instructions executable by a processor, to not provide data during the at least a portion of the determined period.

16. The method according to claim 7, further comprising:
selecting a stiffness of a skin of the streamer based on properties of the gel to further attenuate noise.

17. A seismic streamer comprising:
a streamer body comprising:
a streamer body length; and
a channel;
a seismic sensor disposed within the channel of the streamer body; and
a gel disposed within at least a portion of the channel, the gel comprising a thermo-reversible polymer dissolved in a fluid, wherein a concentration of the thermo-reversible polymer in the gel is between about 5% and about 25% by weight of the gel and wherein the gel is configured to comprise a complex viscosity of at least 50 Pascals.

18. The seismic streamer according to claim 17, wherein the complex viscosity of the gel is configured to be between about 50 Pascals and about 1500 Pascals.

19. The seismic streamer according to claim 18, wherein the complex viscosity of the gel is configured to be between about 100 Pascals and about 1000 Pascals.

20. The seismic streamer according to claim 17, wherein the concentration of the thermo-reversible polymer is between the range of about 10% and about 20% by weight.

21. The seismic streamer according to claim 20, wherein the concentration of the thermo-reversible polymer is about 15%.

22. The seismic streamer according to claim 17, wherein the gel transforms into a solid form in contact with water.

23. The seismic streamer according to claim 17, wherein a stiffness of a skin of the streamer is selected based on the gel, the streamer skin and gel facilitating in attenuating a noise signal.

24. The seismic streamer according to claim 17, wherein the thermo-reversible polymer is dissolved in isoparaffin.

25. The seismic streamer according to claim 17, wherein the thermo-reversible polymer comprises an oil gel or a polymer gel.

* * * * *